United States Patent
Wang et al.

(10) Patent No.: US 12,482,259 B2
(45) Date of Patent: Nov. 25, 2025

(54) METHOD FOR DETERMINING RECOMMENDED SCENARIO AND ELECTRONIC DEVICE

(71) Applicant: HONOR DEVICE CO., LTD., Shenzhen (CN)

(72) Inventors: Yonghua Wang, Shenzhen (CN); Shiyu Zhu, Shenzhen (CN); Zhen Dong, Shenzhen (CN); Yongxing Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/010,316

(22) PCT Filed: May 19, 2022

(86) PCT No.: PCT/CN2022/093974
§ 371 (c)(1),
(2) Date: Dec. 14, 2022

(87) PCT Pub. No.: WO2022/267783
PCT Pub. Date: Dec. 29, 2022

(65) Prior Publication Data
US 2024/0193945 A1  Jun. 13, 2024

(30) Foreign Application Priority Data

Jun. 23, 2021 (CN) .......................... 202110701779.X

(51) Int. Cl.
*G06F 3/0481* (2022.01)
*G06V 20/40* (2022.01)
*H04W 4/02* (2018.01)

(52) U.S. Cl.
CPC ............ *G06V 20/41* (2022.01); *G06F 3/0481* (2013.01); *H04W 4/02* (2013.01)

(58) Field of Classification Search
CPC ...................................................... G06V 10/82
See application file for complete search history.

(56) References Cited

U.S. PATENT DOCUMENTS 9,143,679 B2   9/2015 Sudo et al.
9,536,161 B1   1/2017 Lish et al.
(Continued)

FOREIGN PATENT DOCUMENTS

CN   103227896 A   7/2013
CN   109495688 A   3/2019
(Continued)

*Primary Examiner* — Di Xiao
(74) *Attorney, Agent, or Firm* — WOMBLE BOND DICKINSON (US) LLP

(57) ABSTRACT

This application provides a method for determining a recommended scenario and an electronic device. The method includes: determining a recommended scenario of a current image based on a moving distance of a camera on an electronic device and a relationship between a current image and a previous image. When a slight shake occurs on the electronic device or the camera on the electronic device, or a photographed object/scenario does not change violently, continuity of a recommended scenario is preferably ensured, a probability of a jump of the recommended scenario is reduced, and user experience during image shooting is greatly improved.

20 Claims, 26 Drawing Sheets

(56) References Cited

U.S. PATENT DOCUMENTS

| | | |
|---|---|---|
| 2010/0020191 A1 | 1/2010 | Sugimoto |
| 2010/0035637 A1* | 2/2010 | Varanasi ............ G01C 21/3647 |
| | | 348/E5.022 |
| 2011/0007177 A1 | 1/2011 | Kang et al. |
| 2014/0168358 A1 | 6/2014 | Gong et al. |
| 2015/0189181 A1 | 7/2015 | Razavi et al. |
| 2019/0342492 A1 | 11/2019 | Lucero et al. |
| 2020/0053276 A1 | 2/2020 | Kim et al. |
| 2020/0244885 A1 | 7/2020 | Li et al. |
| 2022/0215191 A1* | 7/2022 | Brownsberger ... A47G 19/2227 |
| 2023/0007167 A1* | 1/2023 | Usami .................. H04N 23/632 |
| 2023/0224575 A1* | 7/2023 | Ding .................... H04N 23/635 |
| | | 348/333.03 |

FOREIGN PATENT DOCUMENTS

| | | |
|---|---|---|
| CN | 111246296 A | 6/2020 |
| CN | 111783524 A | 10/2020 |
| CN | 112199582 A | 1/2021 |
| CN | 112887610 A | 6/2021 |
| CN | 113489895 A | 10/2021 |
| WO | 2019071623 A1 | 4/2019 |

\* cited by examiner

METHOD FOR DETERMINING RECOMMENDED SCENARIO AND ELECTRONIC DEVICE

CROSS-REFERENCE TO RELATED APPLICATIONS

This application is a national stage of International Application No. PCT/CN2022/093974, filed on May 19, 2022, which claims priority to Chinese Patent Application No. 202110701779.X, filed on Jun. 23, 2021, both of which are incorporated herein by references in their entireties.

TECHNICAL FIELD

This application relates to the field of electronic technologies, and in particular, to a method for determining a recommended scenario and an electronic device.

BACKGROUND

With development of electronic technologies and continuous improvement of a user requirement for entertainment, more and more users use a photographing function of an electronic device to record and share life. To help the user capture beautiful photos and videos, the electronic device may help the user adjust a shooting parameter by using an artificial intelligence (artificial intelligence, AI) scenario recognition technology, and process the shot photos and videos, thereby meeting an image shooting requirement of the user.

The AI scenario recognition technology may perform scenario recognition based on one or more image frames, so as to determine a current image shooting scenario. For example, when a user photographs a static object such as a plant, a mountain, or a building in a still state, the AI scenario recognition technology may accurately recognize a photographed object, and display a currently recommended scenario on a screen to notify the user of a recognition result. However, apparently, when the user holds the electronic device, it inevitably causes the electronic device to shake, thereby causing inaccurate or jumping results of the AI scenario recognition output, and reducing user experience.

To avoid a result jump of the AI scenario recognition output, a feasible method is as follows: A stabilization apparatus, such as an optical image stabilization (optical image stabilization, OIS), and a handheld cloud platform, is added to a camera on an electronic device or an electronic device. Apparently, by reducing a jitter of a camera on an electronic device, when a user shoots a static object, the electronic device may provide a stable and accurate AI scenario recognition result, so as to obtain a beautiful photo and video.

However, the stabilization apparatus can only reduce a jitter degree of a camera on an electronic device, and cannot completely offset a negative effect caused by the jitter of the camera. In addition, when the camera of the electronic device does not shake, but the camera captures an object change, a result of an AI scenario recognition output is inaccurate or jumps, thereby reducing user experience.

SUMMARY

Embodiments of this application provide a method for determining a recommended scenario, which fully considers continuity of a scenario, and determines a recommended scenario of a current image based on a moving distance of a camera on an electronic device and a relationship between a current image and a previous image.

According to a first aspect, this application provides a method for determining a recommended scenario. The method includes: At a first moment, an electronic device displays a first interface, where the first interface includes a preview box and a first mark, the preview box displays a first image that is collected in real time by a camera of the electronic device, and the first mark is used to identify a scenario corresponding to the first image. At a second moment, the electronic device displays a second interface, where the second interface includes the preview box and a second mark, the preview box displays a second image obtained in real time by the camera of the electronic device, the second mark is used to identify a scenario corresponding to the second image, the second image is different from the first image, and the second moment is different from the first moment. If the electronic device meets a first preset condition, the second mark is the same as the first mark.

In the foregoing embodiment, the electronic device determines, based on the first preset condition, whether the photographed scenario is continuous. If the electronic device determines that the first preset condition is not met, the electronic device determines that the currently photographed scenario is continuous, and configures content of the second mark to be the same as that of the first mark, thereby preventing a user from slightly moving the electronic device or slightly changing a photographed scenario, and improving user experience. In addition, after determining the recommended scenario, the electronic device further performs some software and hardware-related image processing based on the determined recommended scenario, so as to avoid scenario hopping and further reduce overheads of subsequent image processing by the electronic device.

With reference to some embodiments of the first aspect, in some embodiments, the first preset condition is that the electronic device determines that a difference between the first image and the second image is less than or equal to a first preset threshold.

In the foregoing embodiment, the first preset condition is that a difference between the first image and the second image is relatively small. When the first condition is met, a scenario photographed by the electronic device is actually continuous. It is determined, by using the first preset condition rather than the target scenario of the image, whether the photographed scenario is continuous, which is more robust. This is because a slight shake of an electronic device by a user and a dynamic change of a photographed scenario are inevitable. However, training sets of the AI scenario recognition technology are static pictures, and cannot effectively represent continuity of the photographed scenario.

With reference to some embodiments of the first aspect, in some embodiments, that the electronic device determines that a difference between the first image and the second image is less than or equal to a first preset threshold specifically includes: determining, by the electronic device, that a difference between a type and/or a quantity of objects in the first image and a type and/or a quantity of objects in the second image is less than or equal to the first preset threshold; or determining, by the electronic device, that a distance between a data matrix of the first image and a data matrix of the second image is less than or equal to the first preset threshold.

In the foregoing embodiment, the electronic device may determine a gap between the first image and the second image based on a type and/or a quantity of objects in the image, or may determine the gap based on a data difference between images. Based on the purpose of determining the continuity of the scenario, two methods for quantitatively measuring the image gap are proposed.

With reference to some embodiments of the first aspect, in some embodiments, at the first moment, the electronic device is located in a first geographical location, and the first geographical location is used to identify a real-time geographical location in which the electronic device is located. At the second moment, the electronic device is in a second geographical location, and the second geographical location is used to identify a real-time geographical location in which the electronic device is located. The first preset condition is that a distance between the first geographical location and the second geographical location is less than or equal to a second preset threshold.

In the foregoing embodiment, to avoid that the electronic device undertakes computing overheads of image processing, another manner of determining scenario continuity is based on a space location change of the electronic device. Apparently, whether the scenario is consecutive is directly determined by using the spatial location of the electronic device, which can greatly reduce computing overheads of the electronic device. Second, it is also reliable to determine whether a scenario is continuous by using a spatial location of the electronic device. When a user moves the electronic device to a large extent, a photographed scenario may change, that is, the scenario should be discontinuous. When the user moves the electronic device to a small extent, a photographed scenario may not change, and the scenario should be continuous.

With reference to some embodiments of the first aspect, in some embodiments, the electronic device is in a first posture at the first moment, and the first posture includes an azimuth and a pitch angle that are of the electronic device at the first moment. At the second moment, the electronic device is in a second posture, and the second posture includes an azimuth and a pitch angle of the electronic device at the second moment. The first preset condition is that a difference between the azimuth of the electronic device at the first moment and the azimuth of the electronic device at the second moment is less than or equal to a threshold, and a difference between the pitch angle of the electronic device at the first moment and the pitch angle of the electronic device at the second moment is less than or equal to a threshold; or a product of a difference between the azimuth of the electronic device at the first moment and the azimuth of the electronic device at the second moment and a difference between the pitch angle of the electronic device at the first moment and the pitch angle of the electronic device at the second moment is less than a threshold. In the foregoing embodiment, to avoid that the electronic device undertakes computing overheads of image processing, another manner of determining scenario continuity is based on a gesture change of the electronic device, such as a pitch angle or an azimuth angle. Apparently, when a posture of an electronic device changes substantially, for example, rotates, a photographed scenario may change in a probable rate, that is, a scenario should be discontinuous. When the posture of the electronic device changes slightly, the scenario should be continuous.

With reference to some embodiments of the first aspect, in some embodiments, before the displaying, by the electronic device, a second interface at a second moment, where the second interface includes the preview box and a second mark, the method further includes: determining, by the electronic device, a target scenario corresponding to the second image, where the target scenario corresponding to the second image is different from a target scenario corresponding to the first image.

In the foregoing embodiment, when the target scenario of the first image is different from the target scenario of the second image, the second mark displayed by the electronic device is different from the first mark, that is, the recommended scenario of the first image is the same as the recommended scenario of the second image. In this method, user experience caused by a jump of a recommended scenario can be effectively avoided, and computing overheads of subsequent image processing performed by the electronic device based on the recommended scenario are also reduced.

With reference to some embodiments of the first aspect, in some embodiments, before the displaying, by the electronic device, a second interface at a second moment, where the second interface includes the preview box and a second mark, the method further includes: determining, by the electronic device, that the second image has no corresponding target scenario.

In the foregoing embodiment, when the second image has no target scenario, the electronic device still displays a second mark that is the same as the first mark. In the method, user experience caused by a jump of a recommended scenario can be effectively avoided.

With reference to some embodiments of the first aspect, in some embodiments, if the electronic device does not meet the first preset condition, the second mark is different from the first mark.

In the foregoing embodiment, when the electronic device determines that the first preset condition is not met, a large-scale spatial position change may occur in the electronic device itself, or a large-scale change occurs in a camera posture, or a large-scale change occurs in a photographed scenario itself. In this case, a scenario photographed by the electronic device is discontinuous, and a recommended scenario should be changed in a timely manner to ensure accuracy of the recommended scenario.

With reference to some embodiments of the first aspect, in some embodiments, before the second moment, target scenarios corresponding to a plurality of images collected by the electronic device are the same, the electronic device does not meet the first preset condition, and the second mark is different from the first mark.

In the foregoing embodiment, when the electronic device determines that the first preset condition is not met, and the target scenarios corresponding to the plurality of images collected by the electronic device are the same, the scenario corresponding to the second image is discontinuous with the scenario of the first image, and the second image is stabilized in a new scenario. In this case, the recommended scenario should be changed in a timely manner to ensure accuracy of the recommended scenario.

With reference to some embodiments of the first aspect, in some embodiments, if the electronic device does not meet the first preset condition, and the electronic device determines that the second image has no corresponding target scenario, the electronic device does not display/hide the second mark.

In the foregoing embodiment, when the electronic device determines that the first preset condition is not met, a large-scale spatial position change may occur in the electronic device itself, or a large-scale change occurs in a camera posture, or a large-scale change occurs in a photographed scenario itself. In this case, a scenario photographed by the electronic device is discontinuous, and a recommended scenario should be changed in a timely manner to ensure accuracy of the recommended scenario. In addition, because the second image does not have a corresponding target scenario, the electronic device may not display/hide the second mark, so as to avoid misleading the user.

With reference to some embodiments of the first aspect, in some embodiments, before the second moment, a plurality of images collected by the electronic device do not have a corresponding target scenario, the electronic device does not meet the first preset condition, and the electronic device does not display/hide the second mark.

In the foregoing embodiment, when the electronic device determines that the first preset condition is not met and the target scenario corresponding to the plurality of images collected by the electronic device does not exist, the recommended scenario should be changed in time to ensure accuracy of the recommended scenario. In addition, the second image does not have a corresponding target scenario, and none of the plurality of images before the second image have a corresponding target scenario. In this case, the user may not actually start photographing, and the electronic device may not display/hide the second mark.

According to a second aspect, an embodiment of this application provides an electronic device, where the electronic device includes one or more processors and a memory. The memory is coupled to the one or more processors, the memory is configured to store computer program code, the computer program code includes computer instructions, the one or more processors invoke the computer instructions to enable the electronic device to: at a first moment, display a first interface that includes a preview box and a first mark, where the preview box displays a first image captured by a camera of the electronic device in real time, and the first mark is used to identify a scenario corresponding to the first image; and display a second interface at a second moment, where the second interface includes the preview box and a second mark, the preview box displays a second image captured by the camera of the electronic device in real time, the second mark is used to identify a scenario corresponding to the second image, the second image is different from the first image, and the second moment is different from the first moment; and if the first preset condition is met, the second mark is the same as the first mark.

In the foregoing embodiment, the electronic device determines, based on the first preset condition, whether the photographed scenario is continuous. If the electronic device determines that the first preset condition is not met, the electronic device determines that the currently photographed scenario is continuous. Content of the second mark is the same as that of the first mark, thereby preventing a jump of the recommended scenario caused by a user slightly moving the electronic device or slightly changing a photographed scenario, thereby improving user experience. In addition, after determining the recommended scenario, the electronic device further performs some software and hardware-related image processing based on the determined recommended scenario, so as to avoid scenario hopping and further reduce overheads of subsequent image processing by the electronic device.

With reference to some embodiments of the second aspect, in some embodiments, it is determined that a difference between the first image and the second image is less than or equal to a first preset threshold.

With reference to some embodiments of the second aspect, in some embodiments, the one or more processors are specifically configured to invoke the computer instructions, so that the electronic device performs: determining that a difference between a type and/or a quantity of objects in the first image and a type and/or a quantity of objects in the second image is less than or equal to the first preset threshold; or determining that a distance between a data matrix of the first image and a data matrix of the second image is less than or equal to the first preset threshold.

With reference to some embodiments of the second aspect, in some embodiments, at the first moment, the electronic device is in a first geographical location, and the first geographical location is used to identify a real-time geographical location in which the electronic device is located; at the second moment, the electronic device is in a second geographical location, and the second geographical location is used to identify a real-time geographical location in which the electronic device is located; and the first preset condition is that a distance between the first geographical location and the second geographical location is less than or equal to a second preset threshold.

With reference to some embodiments of the second aspect, in some embodiments, at the first moment, the electronic device is in a first posture, and the first posture includes an azimuth and a pitch angle of the electronic device at the first moment; and at the second moment, the electronic device is in a second posture, and the second posture includes an azimuth and a pitch angle at the second moment. The first preset condition is: a difference between the azimuth at the first moment and the azimuth at the second moment is less than or equal to a threshold, and a difference between the pitch angle at the first moment and the pitch angle at the second moment is less than or equal to a threshold; or a product of a difference between the azimuth at the first moment and the azimuth at the second moment and a difference between the pitch angle at the first moment and the pitch angle at the second moment is less than a threshold.

With reference to some embodiments of the second aspect, in some embodiments, the one or more processors are further configured to invoke the computer instructions, so that the electronic device performs: determining a target scenario corresponding to the second image, where the target scenario corresponding to the second image is different from a target scenario corresponding to the first image.

With reference to some embodiments of the second aspect, in some embodiments, the one or more processors are further configured to invoke the computer instructions, so that the electronic device performs: determining that the second image has no corresponding target scenario.

With reference to some embodiments of the second aspect, in some embodiments, the one or more processors are further configured to invoke the computer instructions, so that the electronic device performs: if the first preset condition is not met, the second mark is different from the first mark.

With reference to some embodiments of the second aspect, in some embodiments, the one or more processors are further configured to invoke the computer instructions, so that the electronic device performs: before the second moment, target scenarios corresponding to the plurality of collected images are the same, and the first preset condition is not met, and the second mark is different from the first mark.

With reference to some embodiments of the second aspect, in some embodiments, the one or more processors are further configured to invoke the computer instructions, so that the electronic device performs: if the first preset condition is not met, and it is determined that the second image has no corresponding target scenario, the second mark is not displayed/hidden.

With reference to some embodiments of the second aspect, in some embodiments, the one or more processors are further configured to invoke the computer instructions, so that the electronic device performs: before the second moment, if the collected plurality of images have no corresponding target scenario, and the first preset condition is not met, the second mark is not displayed/hidden.

According to a third aspect, an embodiment of this application provides a chip system, where the chip system is applied to an electronic device, the chip system includes one or more processors, and the processors are configured to invoke computer instructions, so that the electronic device performs the method described in any one of the first aspect or the possible implementations of the first aspect.

According to a fourth aspect, an embodiment of this application provides a computer program product including an instruction. When the computer program product runs on an electronic device, the electronic device performs the method described in any one of the first aspect or the possible implementations of the first aspect.

According to a fifth aspect, an embodiment of this application provides a computer readable storage medium, including an instruction. When the instruction runs on an electronic device, the electronic device performs the method described in any one of the first aspect or the possible implementations of the first aspect.

It may be understood that the electronic device provided in the second aspect, the chip system provided in the third aspect, the computer program product provided in the fourth aspect, and the computer readable storage medium provided in the fifth aspect are all used to execute the method provided in the embodiments of this application. Therefore, for beneficial effects that can be achieved by the method, refer to beneficial effects in the corresponding method. Details are not described herein again.

DESCRIPTION OF EMBODIMENTS

The terms used in the following embodiments of this application are merely intended to describe specific embodiments, but are not intended to limit this application. As used in the specification and the appended claims of this application, singular expressions "one", "a", "the", "the foregoing", and "this" are intended to include plural expressions unless expressly indicated otherwise in their context. It should be further understood that the term "and/or" used in this application refers to and includes any or all possible combinations of one or more listed items. In the following, terms "first" and "second" are merely used for description purposes, and shall not be understood as an indication or implication of relative importance or implicitly indicate the number of indicated technical features. Therefore, a feature defined as "first" or "second" may explicitly or implicitly include one or more of the features. In the description of embodiments of this application, unless otherwise noted, "a plurality of" means two or more. For ease of understanding, the following first describes related terms and related concepts in the embodiments of this application. The terms used in implementations of this application are used to explain only specific embodiments of the application, and are not intended to limit the application.

(1) AI Scenario Recognition

AI scenario recognition is an image processing technology, where one or more image frames may be processed, and a scenario corresponding to the one or more image frames is calculated and determined.

The following exemplarily describes working principles of AI scenario recognition by using the content shown in FIG. 1, FIG. 2A, FIG. 2B, and FIG. 2C as examples.

Figure 1:
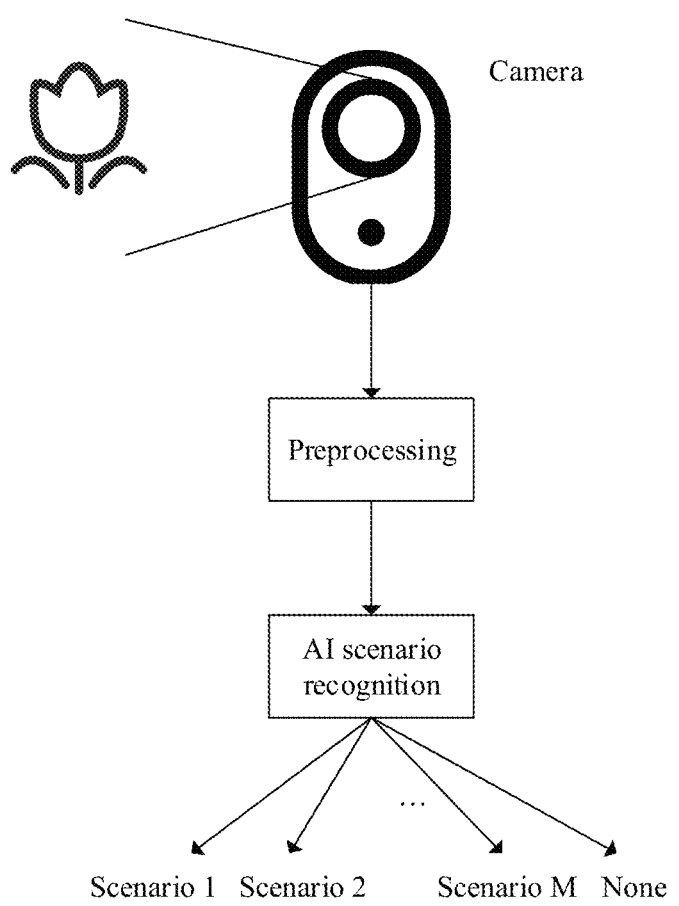
FIG. 1 is a schematic diagram of an example of image processing according to this application.

FIG. 1 is a schematic diagram of an example of image processing according to this application.

As shown in FIG. 1, after obtaining analog image information, a sensor in a camera may convert the image information into a file in a RAW format and output the file in the RAW format to an image signal processor (image signal processor, ISP). After obtaining the file in the RAW format, the ISP performs some preprocessing to generate an image file in a format of JPG, BMP, or the like. A digital signal processor (digital signal processor, DSP) and/or a neural-network processing unit (neural-network processing unit, NPU) may perform AI scenario recognition on the image file. An output of the AI scenario recognition may be one or more scenarios, or may be none.

The preprocessing may include light correction, white balance, color correction, and the like, which is not limited herein.

Figure 2A:
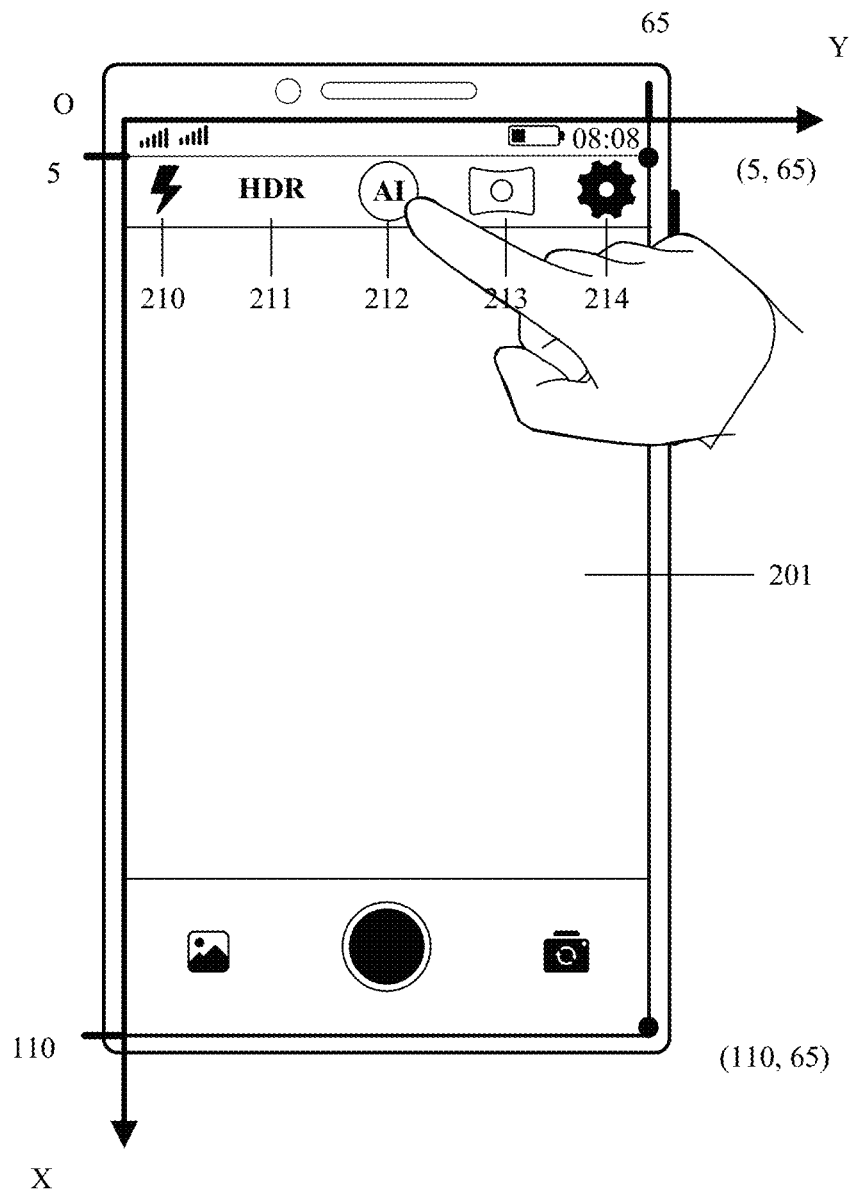
FIG. 2A, FIG. 2B, and FIG. 2C are schematic diagrams of examples of a group of interfaces according to an embodiment of this application.
Figure 2B:
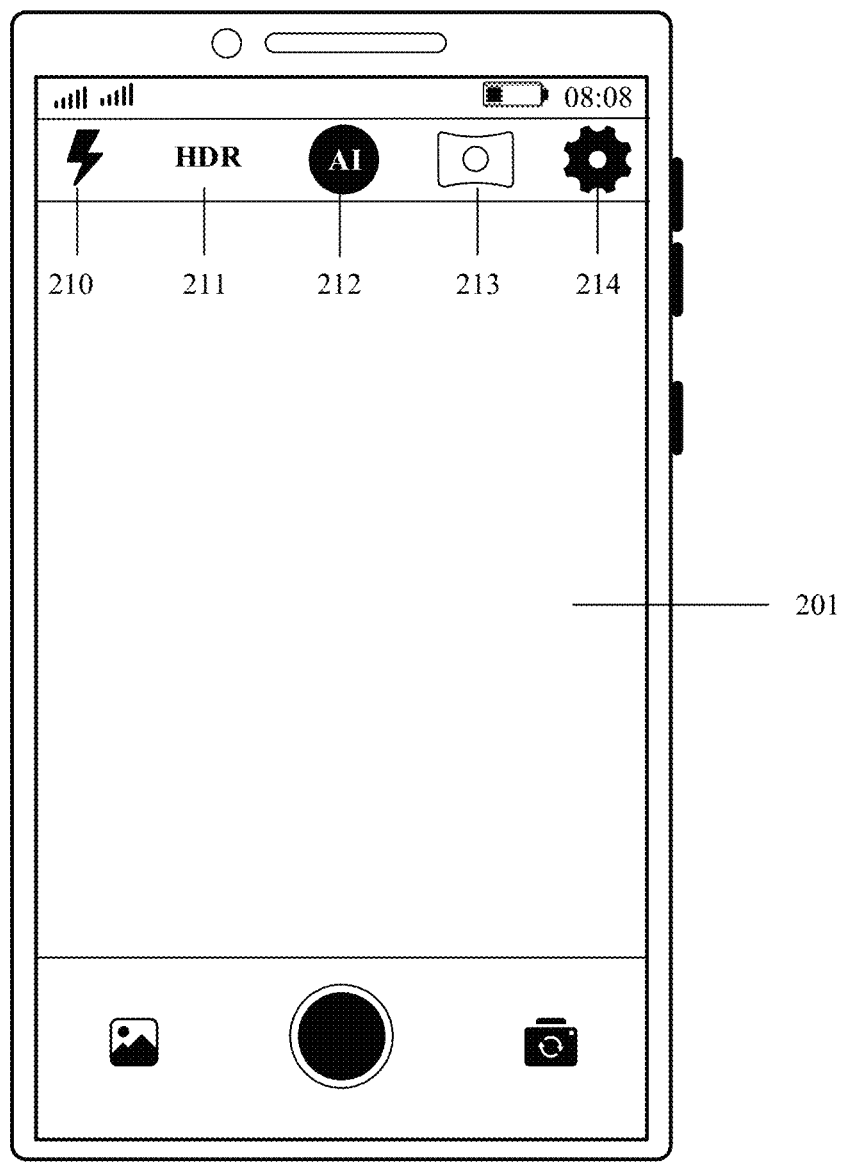
Figure 2C:
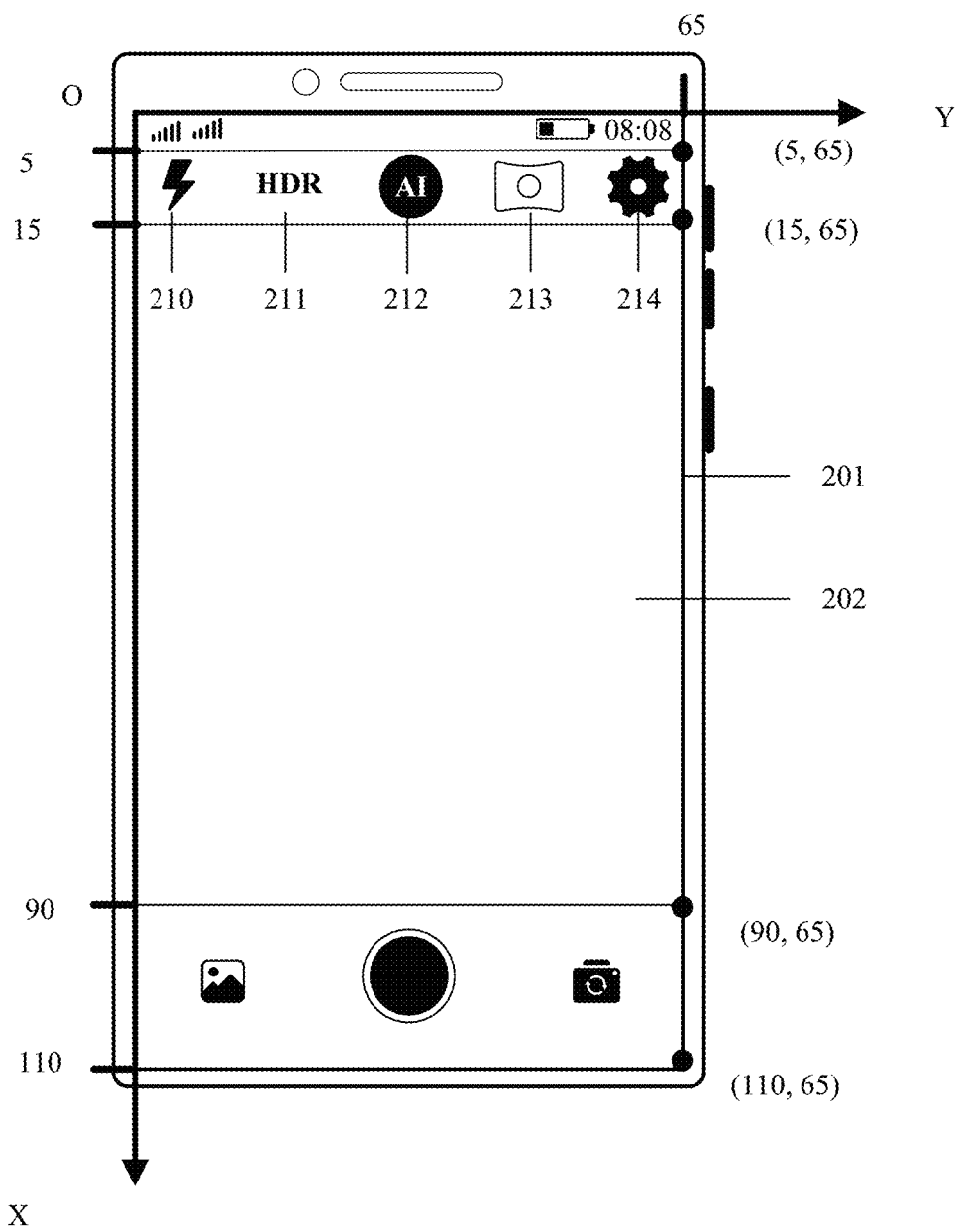

FIG. 2A, FIG. 2B, and FIG. 2C are schematic diagrams of examples of a group of interfaces according to an embodiment of this application.

As shown in FIG. 2A, a home screen interface 201 of a camera is displayed on a screen of an electronic device. The home screen interface 201 includes many controls, for example, a flash switch control 210, an HDR switch control 211, an AI scenario recognition switch control 212, a panoramic mode switching control 213, and a setting control 214.

The home screen interface 201 may also be referred to as a preview box.

A range of the home screen interface may be a rectangular area surrounded by four points (0, 0), (110, 0), (110, 65), and (0, 65) in FIG. 2A. Alternatively, a range of the home screen interface may be a rectangular area surrounded by four points (5, 0), (110, 0), (110, 65), and (5, 65) in FIG. 2A.

The electronic device may receive the user's interaction with a control, such as a tap or a gesture, so as to enable or disable a function corresponding to the control.

For example, the user may tap the flash switch control 210 to switch between three modes: automatic flash, forced flash, and no flash. Similarly, the user may tap the AI scenario recognition switch control 212, so as to enable or disable the AI scenario recognition function. The AI scenario recognition function may also be referred to as AI camera, AI photographing, AI scenario, AI filter, intelligent camera, intelligent photographing, intelligent scenario, intelligent filter, or the like.

After the user taps the AI scenario recognition switch control 212, the AI scenario recognition switch control 212 presents a tap special effect such as ripple, zoom, and color change.

As shown in FIG. 2B, after the user taps the AI scenario recognition switch control 212, a color of the AI scenario recognition switch control 212 changes.

After the user enables the AI scenario recognition function or the electronic device enables the AI scenario recognition function by default, when the user shoots a photo or a video or previews an image by using a viewfinder, the electronic device displays an output result of AI scenario processing on the home screen interface 201 of the camera based on image information obtained by the camera.

As shown in FIG. 2C, different from FIG. 2A, it may be considered that the home screen interface 201 includes a preview box 202.

The preview box 202 is mainly configured to display, in real time, a picture obtained by the camera to the user.

A range of the preview box 202 may be a rectangular area surrounded by four points (5, 0), (110, 0), (110, 65), and (5, 65) in FIG. 2C. Alternatively, a range of the preview box 202 may be a rectangular area surrounded by four points (15,0), (110,0), (110,65), and (15,65) in FIG. 2C. Alternatively, a range of the preview box 202 may be a rectangular area surrounded by four points (5, 0), (90, 0), (90, 65), and (5, 65) in FIG. 2C. Alternatively, a range of the preview box 202 may be a rectangular area surrounded by four points (5, 0), (90, 0), (90, 65), and (5, 65) in FIG. 2C.

It should be noted that, as a form of the electronic device changes, the preview frame may be located on a secondary screen, or may be located on a screen of another electronic device connected to the electronic device. For example, a mobile phone performs image shooting, and the preview frame is located on a screen of a watch/IPAD/VR device.

It should be noted that shapes of the home screen interface 201 and the preview box 202 are not limited to a rectangle, and may change with a shape of a screen of an electronic device, for example, a circle for VR glasses. Optionally, in some embodiments of this application, when the control on the home screen interface 201 is hidden, suspended, and translucent, it may be considered that the preview box 202 has the same size and same range as the home screen interface 201.

Figure 3A:
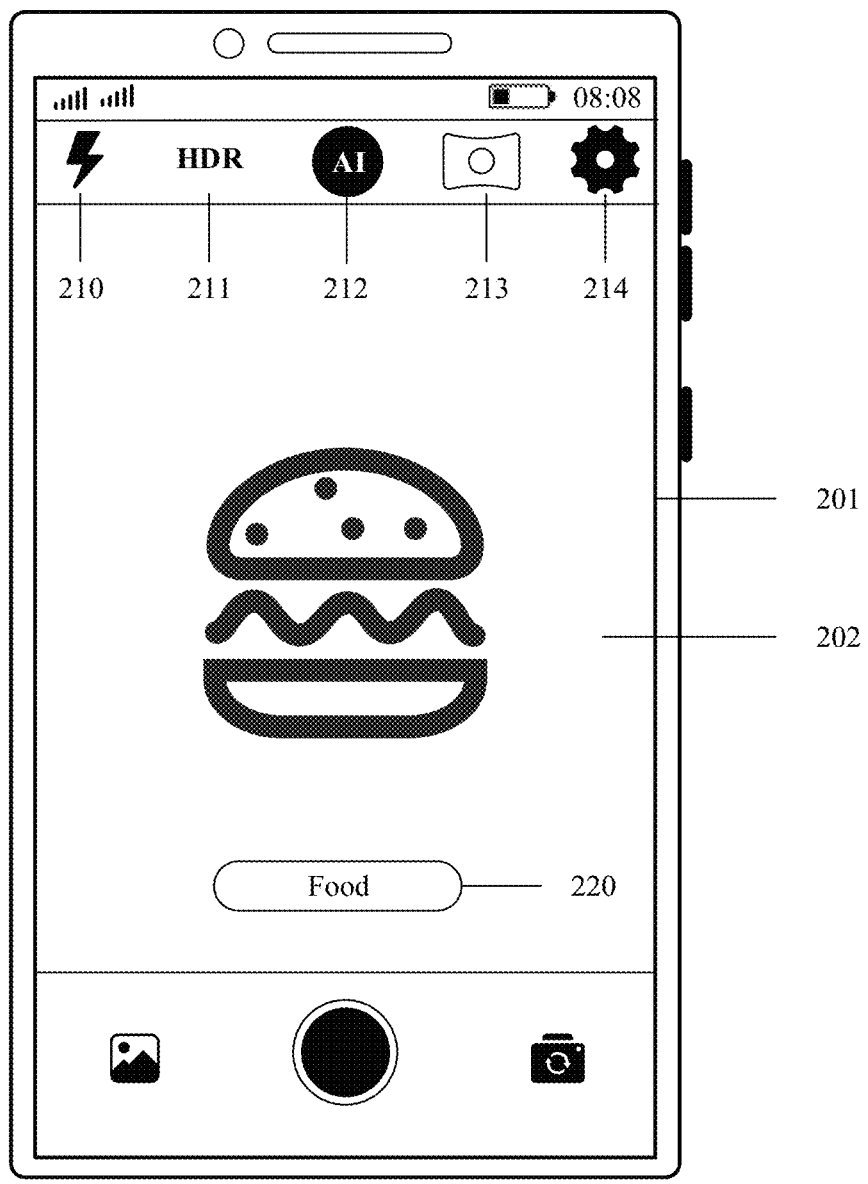
FIG. 3A and FIG. 3B are schematic diagrams of examples of another group of interfaces according to an embodiment of this application.
Figure 3B:
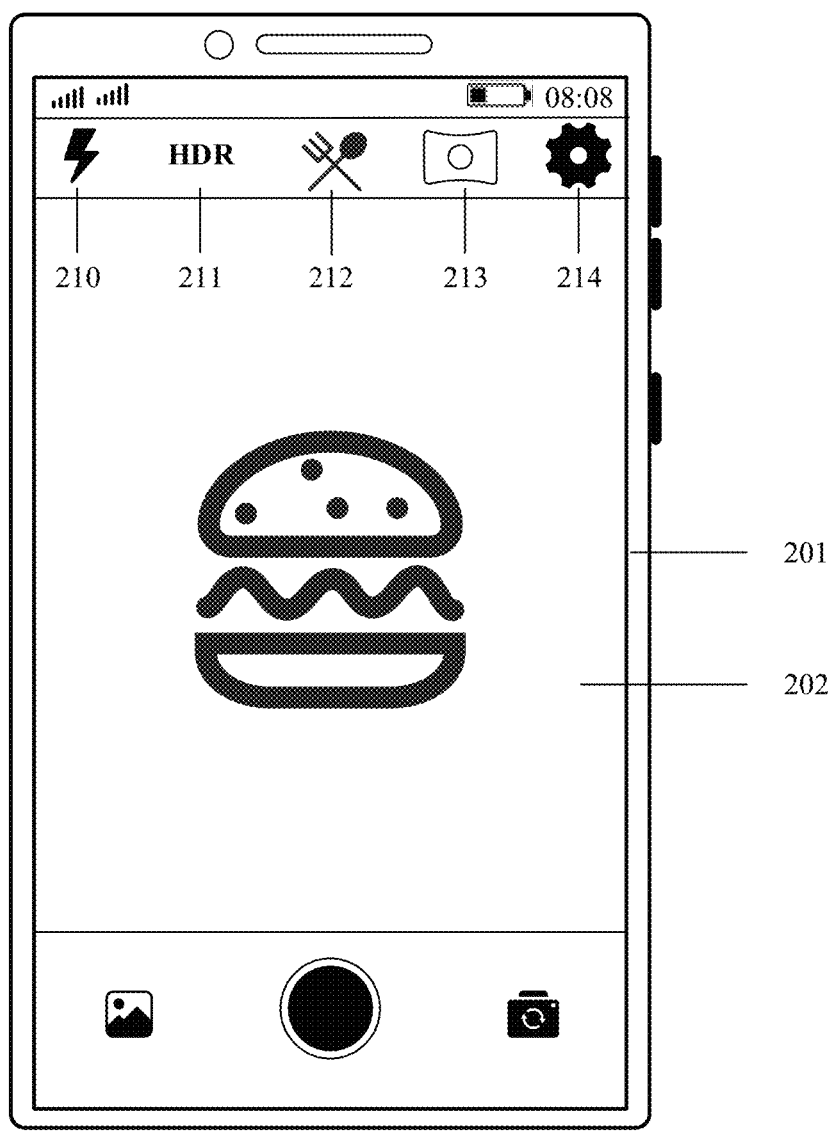

FIG. 3A and FIG. 3B are schematic diagrams of examples of another group of interfaces according to an embodiment of this application.

As shown in FIG. 3A, after the AI scenario recognition function on the electronic device is enabled, a scenario control 220 is displayed on the home screen interface 201/preview box 202, to notify the user of a currently identified scenario. The scenario control 220 may briefly stay on the home screen interface 201/preview box 202, or permanently reside on the home screen interface 201/preview box 202. The Android (Android) system is used as an example. In implementation, the Toast component and the Dialogs component may be used to implement the scenario control 220.

The scenario control 220 may display a text and/or an icon to notify the user of a currently identified scenario. The text and/or the icon displayed by the scenario control or the scenario control may also be referred to as an identifier, a mark or a scenario identifier, or a scenario mark.

It should be noted that the scenario control 220 may be located in another location on the home screen interface/preview box.

Another interface for notifying the user of a currently identified scenario is shown in FIG. 3B. As shown in FIG. 3B, after the AI scenario recognition function on the electronic device is enabled, when a result of the AI scenario recognition is a food scenario, an icon of the AI scenario recognition switch control 212 is displayed as a pattern corresponding to the food scenario (a knife and fork icon represents the food scenario), and further the user is notified of the currently identified scenario.

It should be noted that, after the scenario corresponding to the currently photographed object is determined, parameters such as a frame rate, an aperture, and a focal length of the camera may be adjusted in the AI scenario recognition, so that the hardware parameter is more suitable for photographing in the scenario. Alternatively, an image obtained by the electronic device may be processed through digital signal processing, so that the photographed object displayed on the home screen interface 201/preview box 202 is more beautiful and/or an object in an image file stored after photographing is more beautiful.

(2) Valid Unit Frame and Invalid Unit Frame

The unit frame is one or more consecutive/spaced image frames.

A unit frame may be classified into a valid unit frame or an invalid unit frame according to whether a target scenario corresponding to the unit frame is trusted. A target scenario corresponding to a valid unit frame is trusted, and a target scenario corresponding to an invalid unit frame is not trusted. Alternatively, a unit frame may be classified into a valid unit frame or an invalid unit frame according to whether the unit frame has a corresponding target scenario.

The valid unit frame has a corresponding target scenario, and the invalid unit frame has no corresponding target scenario.

In this embodiment of this application, when each image frame is clear, one or more consecutive image frames may be selected as a unit frame. When several individual image frames are blurred, one or more spaced image frames may be selected as a unit frame.

Optionally, in some embodiments of this application, AI scenario recognition may be performed on a plurality of consecutive/spaced image frames combined into one unit frame. It may be understood that, by combining a plurality of image frames, image clarity can be further improved, noise during data processing can be reduced, and accuracy of AI scenario recognition can be improved.

Optionally, in some embodiments of this application, AI scenario recognition may be performed on each of the plurality of consecutive/spaced image frames, and data fusion is performed on scenarios that are output by AI scenario recognition corresponding to the image frames, so as to obtain a target scenario with a higher confidence level.

The following exemplarily describes a relationship between a unit frame and a target scenario.

For example, when the output of the AI scenario recognition processing of the unit frames is shown in FIG. 1, that is, the output of the AI scenario recognition is scenario 1, scenario 2, . . . , scenario M, and null, the invalid image frame may be a unit frame corresponding to null, and the valid unit frames may be unit frames corresponding to scenario 1, scenario 2, . . . , scenario M. M is an integer greater than 2.

For another example, when the output of the AI scenario recognition processing of the unit frames is [scenario 1, confidence 1], [scenario 2, confidence 2], . . . , and [scenario M, confidence M]. In this case, a scenario corresponding to the unit frame is considered as one or more scenarios with a highest confidence level. If confidence of a scenario corresponding to a unit frame is greater than or equal to a confidence threshold, it is considered that the unit frame is a valid unit frame; or if confidence of a scenario corresponding to a unit frame is less than the confidence threshold, it is considered that the unit frame is an invalid unit frame.

Table 1 is an example of a table of a correspondence between a unit frame and a scenario according to an embodiment of this application.

TABLE 1

|  | Food scenario | Sky scenario | River scenario | Plant scenario | . . . |
|---|---|---|---|---|---|
| Unit frame 1 | 0.872 | 0.045 | 0.089 | 0.176 | . . . |
| Unit frame 2 | 0.234 | 0.029 | 0.001 | 0.163 | . . . |

As shown in Table 1, because a scenario with a highest confidence of the unit frame 1 is the food scenario, a scenario corresponding to the unit frame 1 is the food scenario. Because a scenario with a highest confidence of the unit frame 2 is the food scenario, a scenario corresponding to the unit frame 2 is the food scenario.

If the confidence threshold is 0.7, the unit frame 1 is a valid unit frame, and the unit frame 2 is an invalid unit frame.

Alternatively, as shown in Table 1, because the scenario with the highest confidence of the unit frame 1 is the food scenario, and the confidence 0.872 of the food scenario is higher than the confidence threshold 0.7, the scenario corresponding to the unit frame 1 is the food scenario. Because the scenario with the highest confidence of the unit frame 2 is the food scenario, and the confidence 0.234 of the food scenario is less than the confidence threshold 0.7, the scenario corresponding to the unit frame 2 is none. In this case, the unit frame 1 is a valid unit frame, and the unit frame 2 is an invalid unit frame.

It should be noted that, any unit frame may be determined as a valid unit frame or an invalid unit frame in a plurality of manners based on output content of AI scenario recognition.

It may be understood that classifying unit frames into a valid unit frame and an invalid unit frame fully uses an output result of AI scenario recognition, and lays a foundation for determining a recommended scenario in a subsequent step.

The following describes a target scenario determining method related to this application. When the user uses the photographing function, to timely recommend a scenario to the user, the AI scenario recognition result of the current image frame may be recommended to the user as the target scenario, and the photographed image displayed on the home screen interface 201 may be adjusted based on the scenario.

Figure 4:
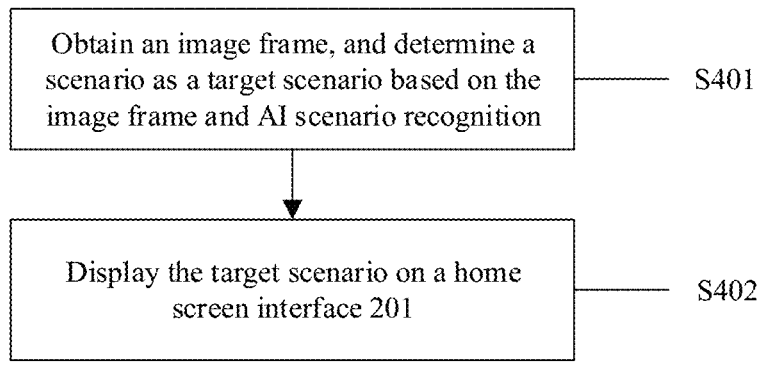
FIG. 4 is a schematic diagram of an example of a photographing scenario determining method according to this application.

FIG. 4 is a schematic diagram of an example of a photographing scenario determining method according to this application.

As shown in FIG. 4, a photographing scenario determining method related to this application includes the following steps.

S401: Obtain an image frame, and determine a scenario as a target scenario based on the image frame and AI scenario recognition.

S402: Display the target scenario on a home screen interface 201.

For a method for determining the target scenario based on the image frame and the AI scenario recognition, reference may be made to the text description of the valid unit frame and the invalid unit frame in the term interpretation.

For display of the target scenario on the home screen interface 201/preview box 202, refer to the text description corresponding to FIG. 3A and FIG. 3B. Details are not described herein again.

Figure 5A:
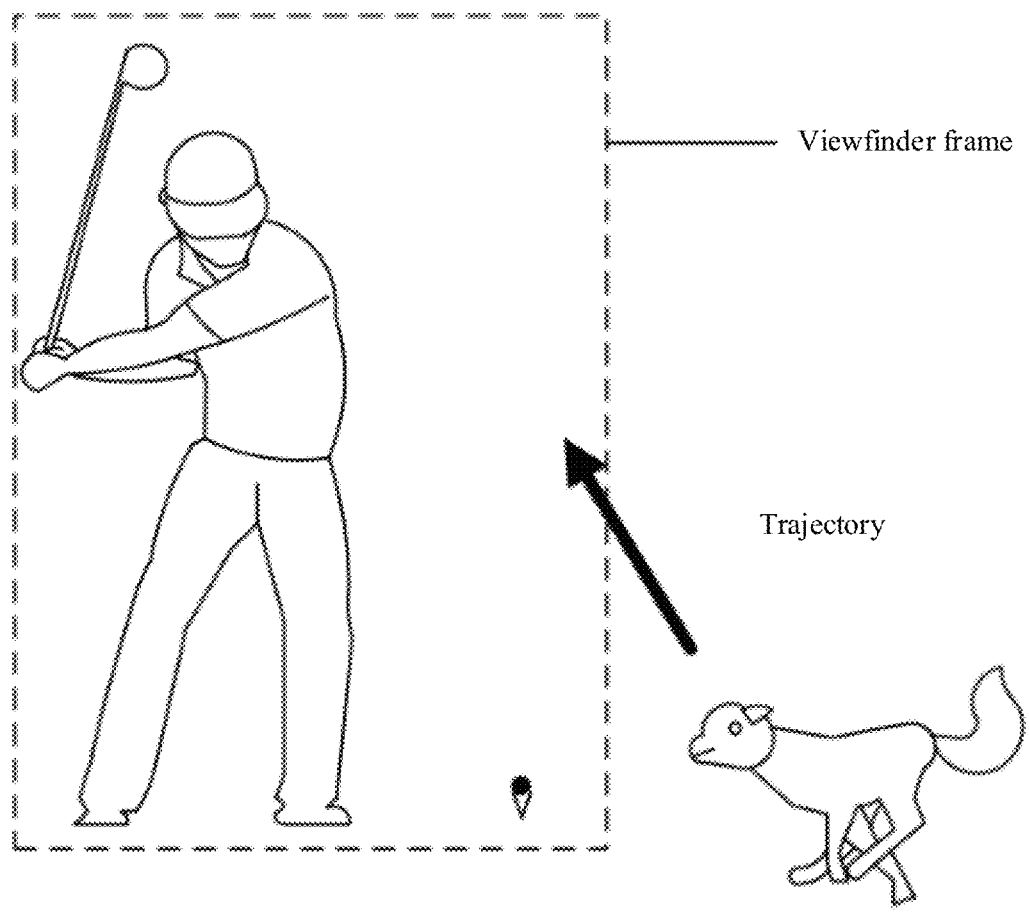
FIG. 5A, FIG. 5B, and FIG. 5C are schematic diagrams of examples of a photographing background according to an embodiment of this application.
Figure 5B:
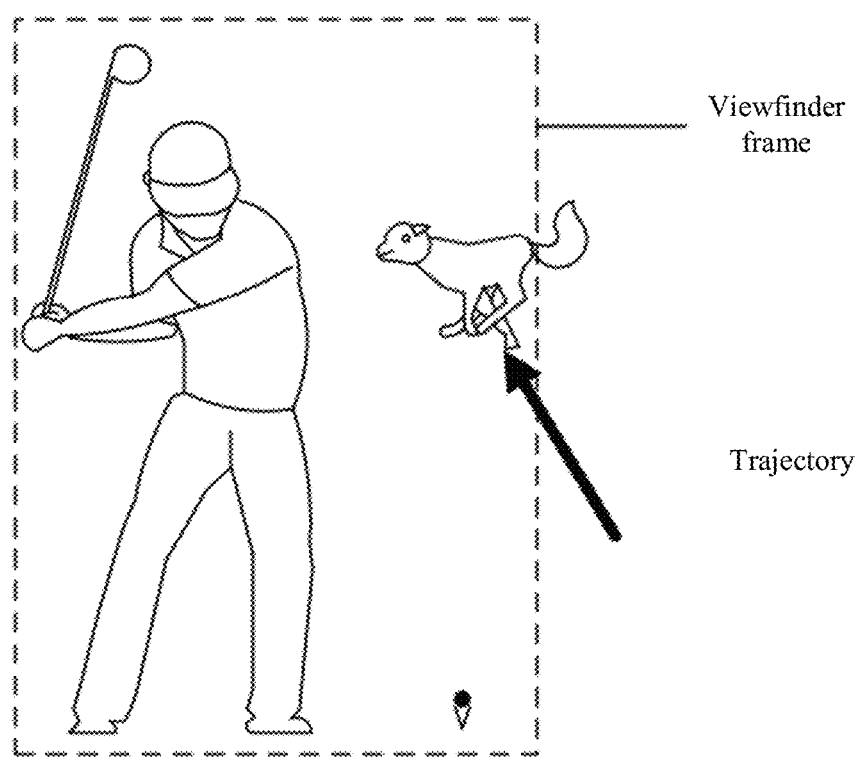
Figure 5C:
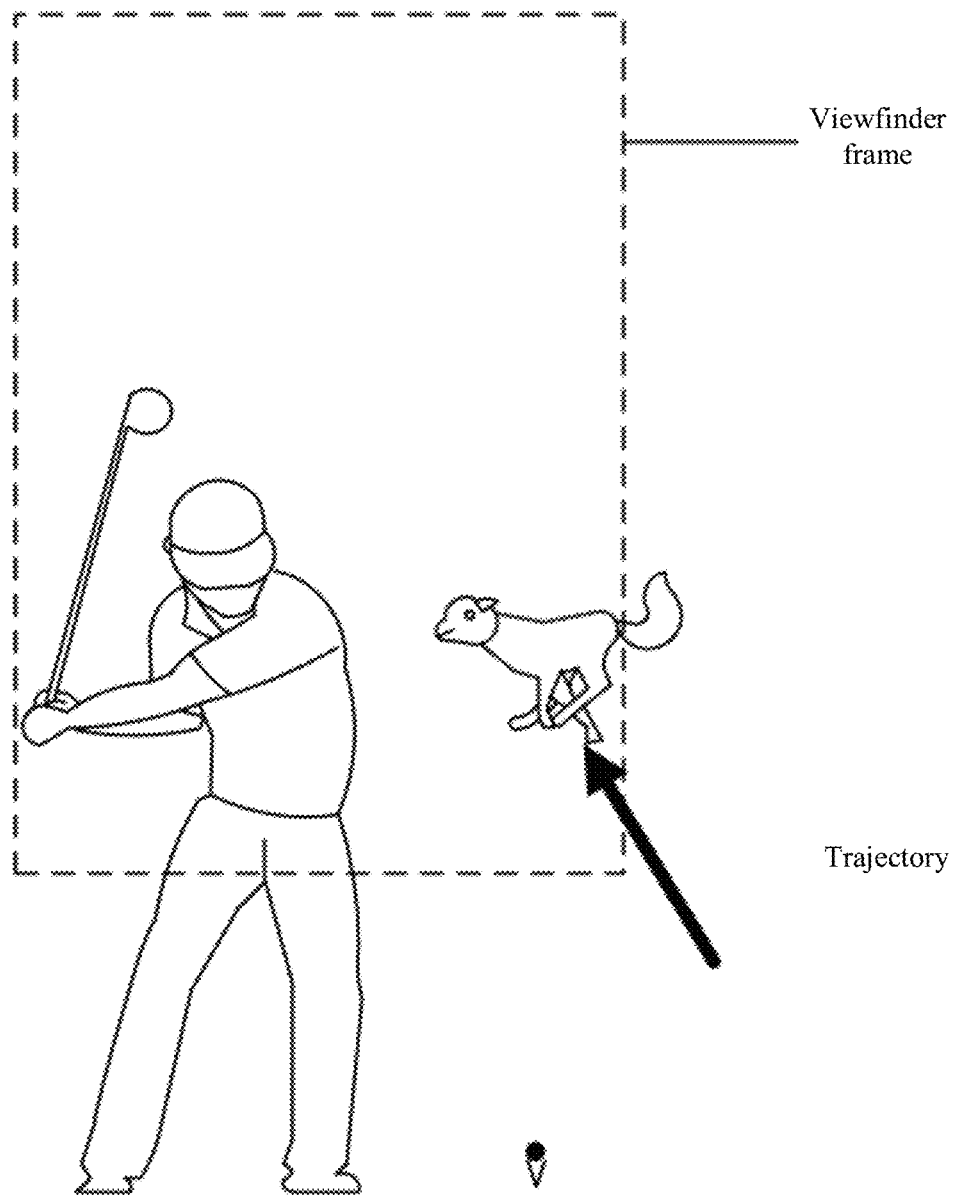

FIG. 5A, FIG. 5B, and FIG. 5C are schematic diagrams of examples of a photographing background according to an embodiment of this application.

Figure 6A:
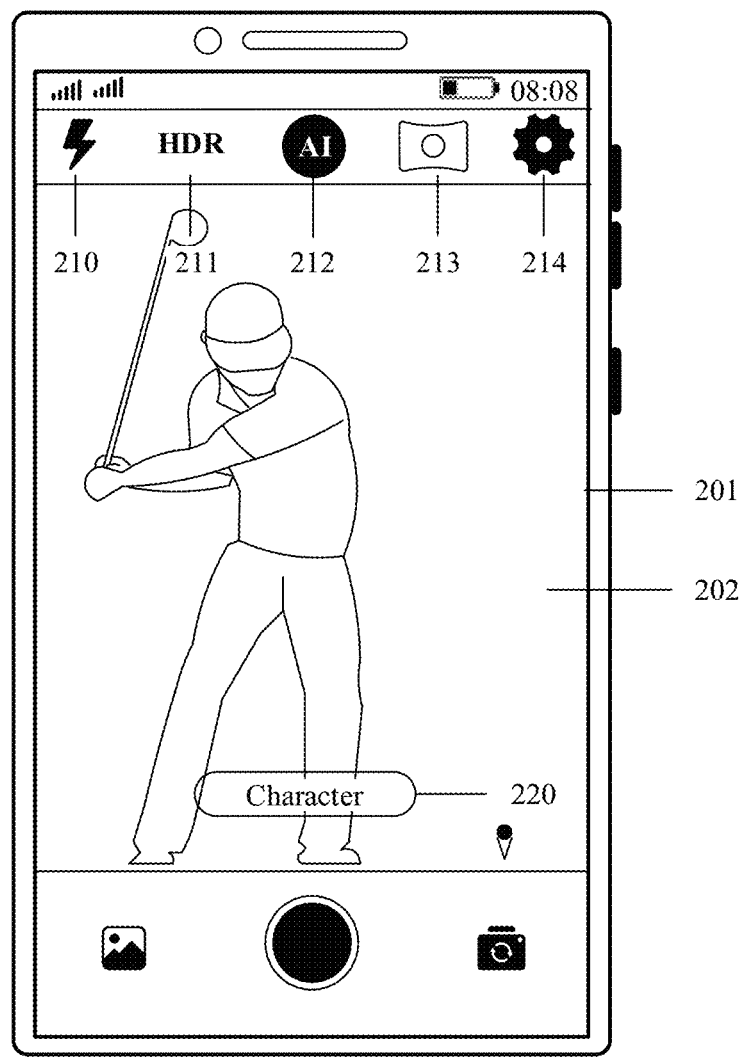
FIG. 6A, FIG. 6B, and FIG. 6C are schematic diagrams of examples of interfaces of a method for determining a target scenario in the photographing background shown in FIG. 5A, FIG. 5B, and FIG. 5C according to this application.
Figure 6B:
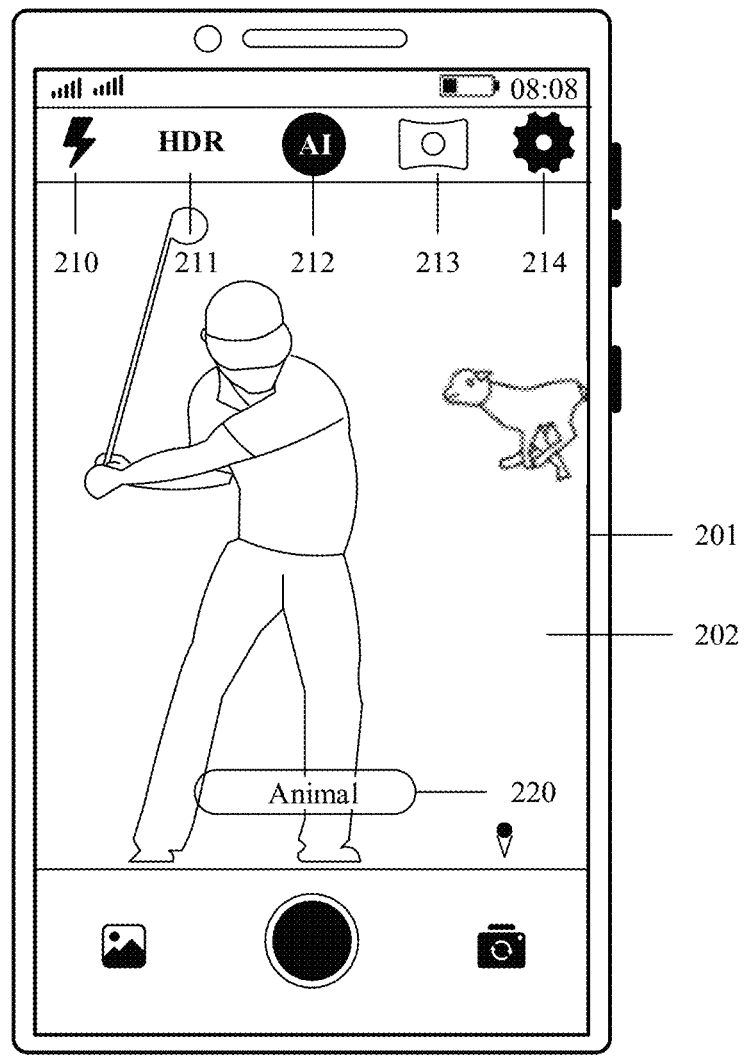
Figure 6C:
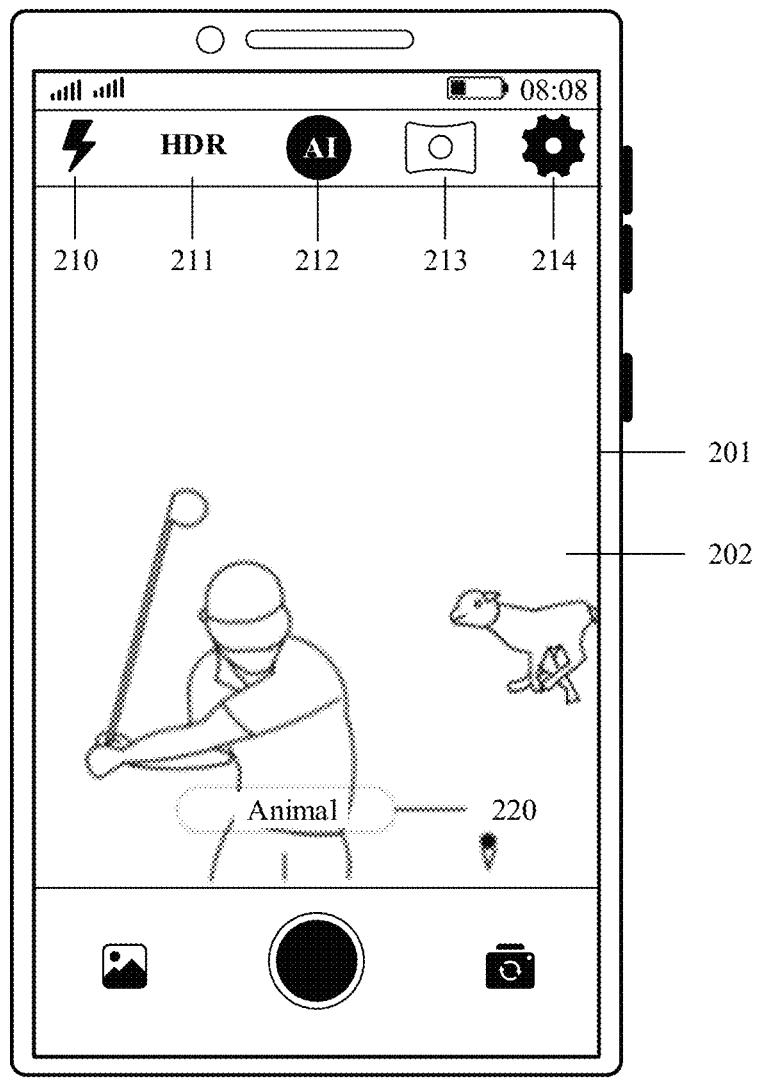

Corresponding to FIG. 5A, FIG. 5B, and FIG. 5C respectively, FIG. 6A, FIG. 6B, and FIG. 6C are schematic diagrams of examples of interfaces of a method for determining a target scenario in the photographing background shown in FIG. 5A, FIG. 5B, and FIG. 5C according to this application.

As shown in FIG. 5A, when a user photographs another person, a picture displayed in the home screen interface 201/preview box 202 corresponds to a background delineated by a viewfinder frame. When the viewfinder frame includes only the photographed person, the electronic device may accurately identify the target scenario as a character scenario, and further display the target scenario on the home screen interface 201/preview box 202 as shown in FIG. 6A.

However, apparently, when a photographed object changes, that is, background content delimited by the viewfinder frame changes, an output of AI scenario recognition based on an image frame may change.

In a photographing process of the user, one animal moves from a left side of the photographed person to a right side of the photographed person. As shown in FIG. 5B, at a moment, a camera of the electronic device captures both the animal and the photographed person, that is, a background delimited by the viewfinder frame includes the animal and the photographed person. Because the image frame obtained by the electronic device includes the animal and the photographed person, the electronic device identifies, based on the image frame, that the target scenario is a character scenario or an animal scenario. If the target scenario corresponding to the image frame is an animal scenario, the electronic device displays the target scenario on the home screen interface 201/preview box 202 as shown in FIG. 6B.

Alternatively, when the user moves the electronic device during photographing, spatial displacement or rotation of the camera may cause a change of background content delimited by the viewfinder frame. When the background content changes, the output of the AI scenario recognition based on an image frame may change.

It may be learned from comparison between content shown in FIG. 5A and FIG. 5C that, because the user moves the electronic device, a space location of the viewfinder frame corresponding to the camera changes, and consequently, background content of the viewfinder frame changes. In this case, the background delimited by the viewfinder frame includes the animal and the photographed person. Because the image frame obtained by the electronic device includes the animal and the photographed person, the electronic device identifies, based on the image frame, that the target scenario is a character scenario or an animal scenario. If the target scenario corresponding to the image frame is an animal scenario, the electronic device displays the target scenario on the home screen interface 201/preview box 202 as shown in FIG. 6B.

Apparently, when the space location of the camera of the electronic device does not change and the camera does not rotate, and both photographed person and object are static, the AI scenario recognition can output an accurate target scenario based on an image frame.

However, due to robustness, accuracy, and the like of an AI scenario recognition algorithm, when the AI scenario recognition outputs an incorrect target scenario, a target scenario displayed on the electronic device may jump. In addition, when a spatial displacement or rotation of the electronic device or a change of the photographed object causes a change in content of the image frame, a target scenario output by the AI scenario recognition is jumping, which reduces user experience. Further, if the electronic device performs image processing on the image frame based on the target scenario, computing overheads of the electronic device are increased.

Figure 7A:
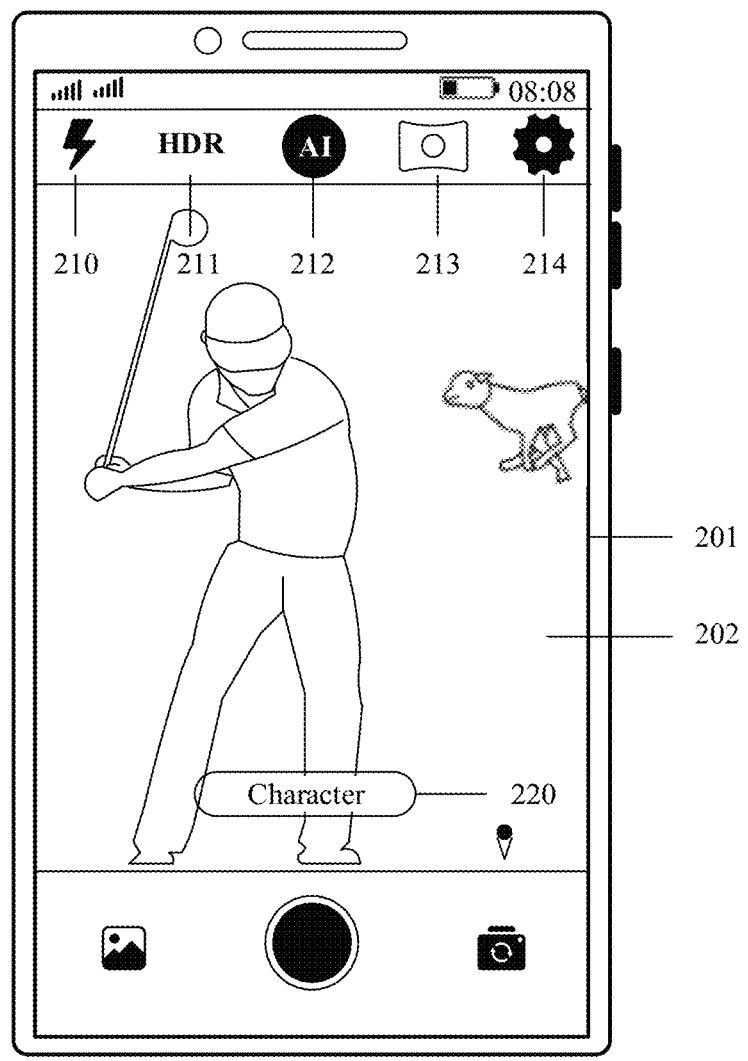
FIG. 7A and FIG. 7B are schematic diagrams of a group of interfaces of a method for determining a recommended scenario according to an embodiment of this application.
Figure 7B:
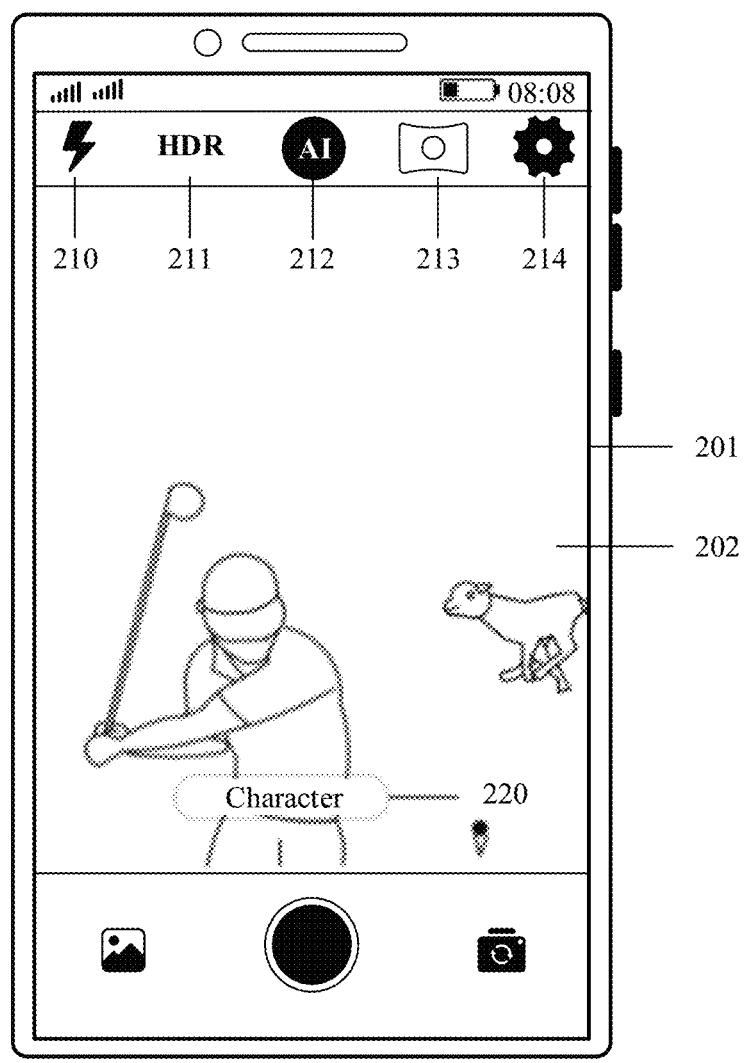

FIG. 7A and FIG. 7B are schematic diagrams of a group of interfaces of a method for determining a recommended scenario according to an embodiment of this application.

Different from the photographing scenario determining method shown in FIG. 4, in the method for determining a recommended scenario provided in this embodiment of this application, AI scenario recognition is first performed based on a unit frame rather than an image frame. After a target scenario output through AI scenario recognition is obtained, it is determined, based on a plurality of unit frames and/or information about an apparatus such as a gyroscope, whether an image change between the current unit frame and a previous unit frame is excessively large, and a recommended scenario is determined based on a target scenario output through AI scenario recognition by using the previous unit frame, so that the recommended scenario is displayed on the home screen interface 201/preview block 202.

In cases shown in FIG. 5A, FIG. 5B, and FIG. 5C, the target scenario recommendation method provided in the embodiment of this application is implemented. Interfaces displayed on the electronic device are shown in FIG. 6A, FIG. 7A, and FIG. 7B.

In the case shown in FIG. 5A, the electronic device may accurately identify a target scenario as a character scenario, and further display the target scenario on the home screen interface 201/preview box 202 as shown in FIG. 6A.

In the cases shown in FIG. 5B and FIG. 5C, when a target scenario output through AI scenario recognition is a character scenario, considering that a target scenario corresponding to a previous unit frame is a character scenario, it is determined that the recommended scenario is the same as the target scenario corresponding to the unit frame, and further, the recommended scenario is displayed on the home screen interface 201/preview box 202 as shown in FIG. 6A. In the case shown in FIG. 5B, when a target scenario output through AI scenario recognition is an animal scenario, considering that a target scenario corresponding to a previous unit frame is a character scenario, it is determined that the recommended scenario may be none or a character scenario.

After determining the recommended scenario, the electronic device may display the recommended scenario on the home screen interface 201/preview block 202, as shown in FIG. 7A and FIG. 7B.

Next, the following exemplarily describes a method for determining a recommended scenario according to an embodiment of this application.

Figure 8A:
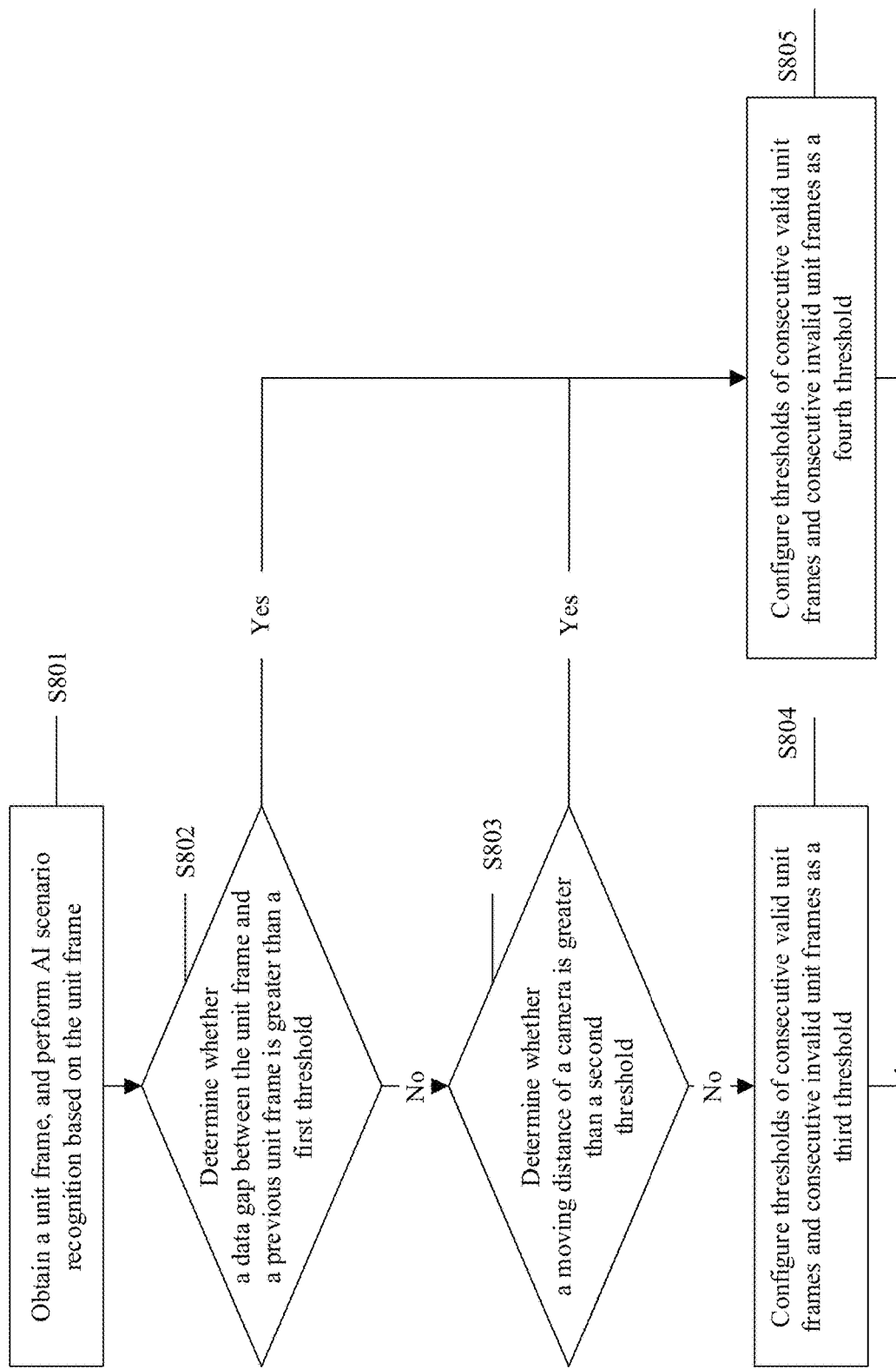
FIG. 8A and FIG. 8B are a schematic diagram of an example of a method for determining a recommended scenario according to an embodiment of this application.
Figure 8B:
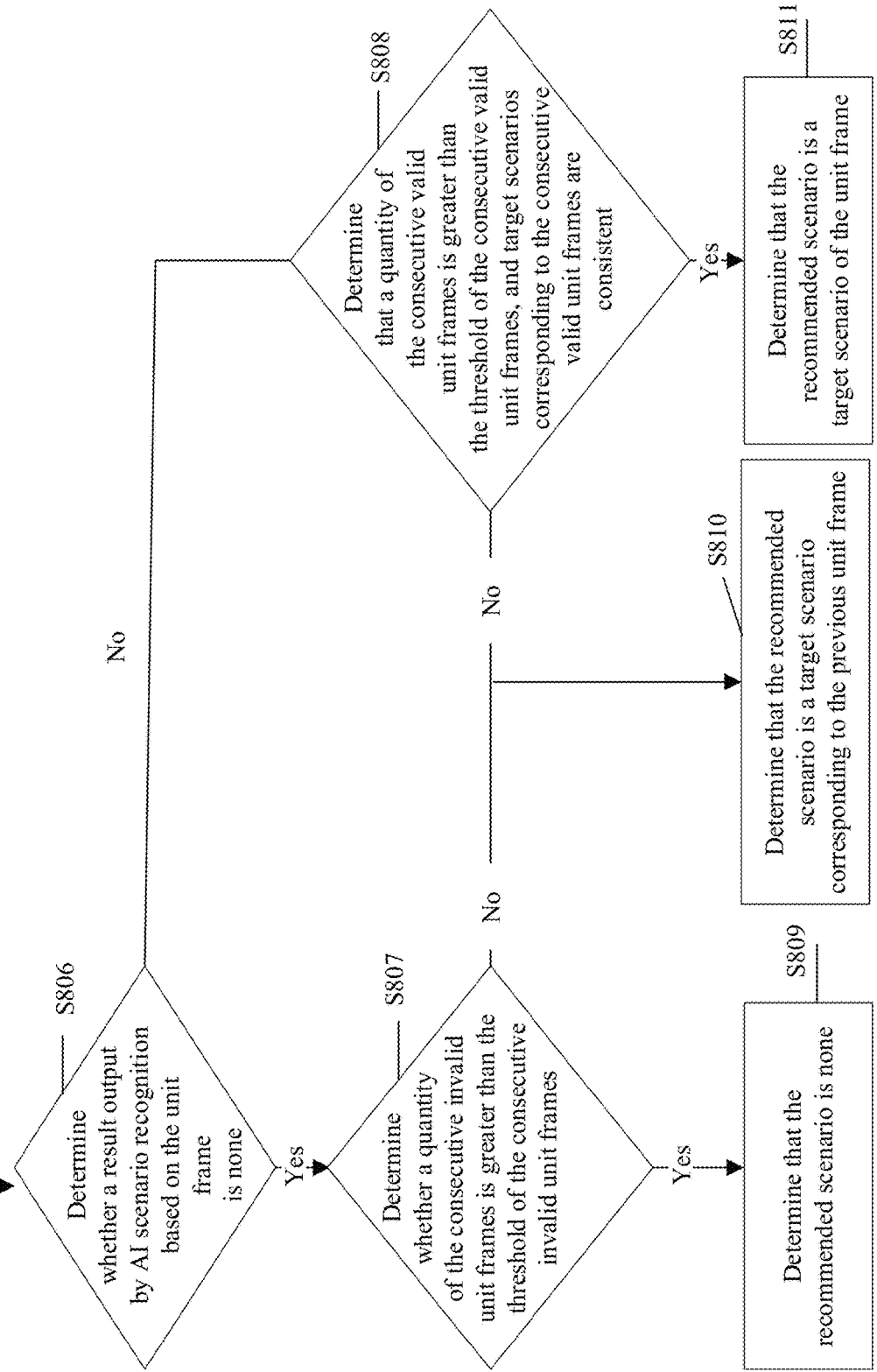

FIG. 8A and FIG. 8B are a schematic diagram of an example of a method for determining a recommended scenario according to an embodiment of this application.

As shown in FIG. 8A and FIG. 8B, the method for determining a recommended scenario provided in this embodiment of this application includes the following steps.

S801: Obtain a unit frame, and perform AI scenario recognition based on the unit frame.

Specifically; the electronic device may obtain one or more consecutive/spaced image frames as one unit frame, and perform AI scenario recognition based on the unit frame. The output recognized based on the AI scenario of the unit frame may be a target scenario or none.

For a concept of a term such as a unit frame, AI scenario recognition, and AI scenario recognition method based on a unit frame, refer to (1) AI scenario recognition in the term interpretation and (2) a text description in the unit frame. Details are not described herein again.

Optionally, in some embodiments of this application, after the unit frame is obtained, AI scenario recognition may be first not performed on the unit frame. Perform AI scenario recognition on the unit frame in step S804 or before step S804 or before step S805 or before step S805.

Step S802 is performed.

S802: Determine whether a data gap between the unit frame and a previous unit frame is greater than a first threshold.

Specifically, after obtaining the unit frame, the electronic device may compare a data gap between the unit frame and the previous unit frame, and determines whether the gap is greater than the first threshold. If yes, step S805 is performed. If no, step S803 is performed.

The first threshold may be preset by the electronic device, or may be obtained by using a cloud server. The previous unit frame is a previous unit frame of the unit frame.

A data gap between the unit frame and the previous unit frame may be determined in a plurality of manners, which is not limited herein.

For example, a data gap between the unit frame and a previous unit frame may be considered as a distance between one data matrix and another data matrix, or a distance between a plurality of data matrices and a plurality of data matrices. A distance between data matrices may be determined by using a method such as 1 norm, 2 norm, and infinite norm.

For another example, a data gap between the unit frame and a previous unit frame may be determined according to a type and a quantity of objects included in an image corresponding to the unit frame. A type and a quantity of objects included in the image corresponding to the unit frame may be determined by using an image recognition technology. The image recognition technology is configured to determine a recognizable object included in one or more images, a position of the object in the image, an area occupied by the object, and the like. That is, input of the image recognition technology is one or more images, and output is an object in the image, a location of the object, an area occupied by the object, and the like. For example, for the photographing background shown in FIG. 5b and FIG. 5C, objects that may be identified by an image recognition technology include a person, a hat, and a dog.

The electronic device may determine, based on an image recognition technology, an object included in an image corresponding to any unit frame, and may further determine a data gap between the unit frame and the previous unit frame based on a type and an area change of the object. For example, the electronic device determines that a data gap between the $x^{th}$ unit frame and the $y^{th}$ unit frame is Disparity$_{x,y}$. A value of Disparity$_{x,y}$ is related to an object included in an image corresponding to the $x^{th}$ unit frame and an object included in an image corresponding to the $y^{th}$ unit frame. For ease of description, this relationship is described as Disparity$_{x,y}$=f($x_{obj-num-type}$, $y_{obj-num-type}$). $x_{obj-num-type}$ is a type of an object in the unit frame x and a quantity of each object type, $y_{obj-num-type}$ is a type of an object in the unit frame y and a quantity of each object type, and f is a calculation function whose input is a high-dimensional vector.

The following exemplarily describes a process of determining Disparity$_{x,y}$ by using the content shown in Table 2 as an example.

Table 2 is an example of a table of determining a data gap between two unit frames according to an embodiment of this application.

TABLE 2

| Unit frame ID | Type of object-quantity (number)-area (percentage) | Data gap |
| --- | --- | --- |
| Unit frame 1 | Hand-3-15% Noodle-1-10% Pizza-1-18% Tableware-6-16% | Difference from unit frame 2: 0 Difference from unit frame 3: 1 |
| Unit frame 2 | Hand-2-9% Tableware 4-15% Water cup-2-7% | Difference from unit frame 1: 0 Difference from unit frame 2: 1 |
| Unit frame 3 | Dog-2-16% Meat-1-30% Couch-18% | Difference from unit frame 1: 1 Difference from unit frame 2: 1 |

As shown in Table 2, the electronic device may determine a data gap between any two unit frames based on information such as a type and an area of an object included in the unit frame. In a case shown in Table 2, a value of Disparity$_{x,y}$ is limited by the electronic device to be 0 or 1, and in this case, the first threshold is 0.

Optionally, in some embodiments of this application, if AI scenario recognition is performed based on the unit frame in step S801, and a scenario corresponding to the unit frame is a target scenario, the first threshold may be related to the target scenario. It may be understood that, in different target scenarios, different first thresholds may be configured, so as to more accurately determine whether picture content corresponding to the unit frame changes excessively.

For example, when the target scenario corresponding to the current unit frame is a character scenario, the first threshold is 0.2 (normalized). When the target scenario corresponding to the current unit frame is a food scenario, the first threshold is 0.5 (normalized). Apparently, in a character scenario, because a character has more image features than a food, the first threshold in the character scenario may be appropriately reduced.

Optionally, in some embodiments of this application, the data gap between the unit frame and the previous unit frame may be auxiliary determined according to a change of the current camera focal length.

Optionally, in some embodiments of this application, it may be determined whether a sum of data gaps between the unit frame and the plurality of unit frames before the unit frame is greater than the first threshold.

It may be understood that, by using step S802, it is determined whether a difference between a picture corresponding to a current unit frame and a historical picture corresponding to a previous unit frame is greater than a threshold, which helps subsequently perform differentiation processing, and lays a foundation for accurately providing a recommended scenario.

S803: Determine whether a moving distance of a camera is greater than a second threshold.

Optionally, it is determined whether the camera moving distance is greater than the second threshold. If yes, step S805 is performed. If no, step S804 is performed.

The moving distance is used to reflect a space distance between coordinates of an object corresponding to a photographed object or a focal point in a previous unit frame and coordinates of an object corresponding to a photographed object or a focal point in the unit frame. The moving distance may be a space displacement or rotation of the camera itself, or may be a space distance between a picture center of the unit frame and a picture center of the previous unit frame.

The second threshold may be preset by the electronic device, or may be obtained by using a cloud server.

For example, for an electronic device in which an apparatus such as a gyroscope is configured, a moving distance of a camera may be determined based on information of an apparatus such as a gyroscope and an acceleration sensor. Alternatively, the electronic device may determine a moving distance of the camera according to a change between image frames or unit frames.

Figure 9A:
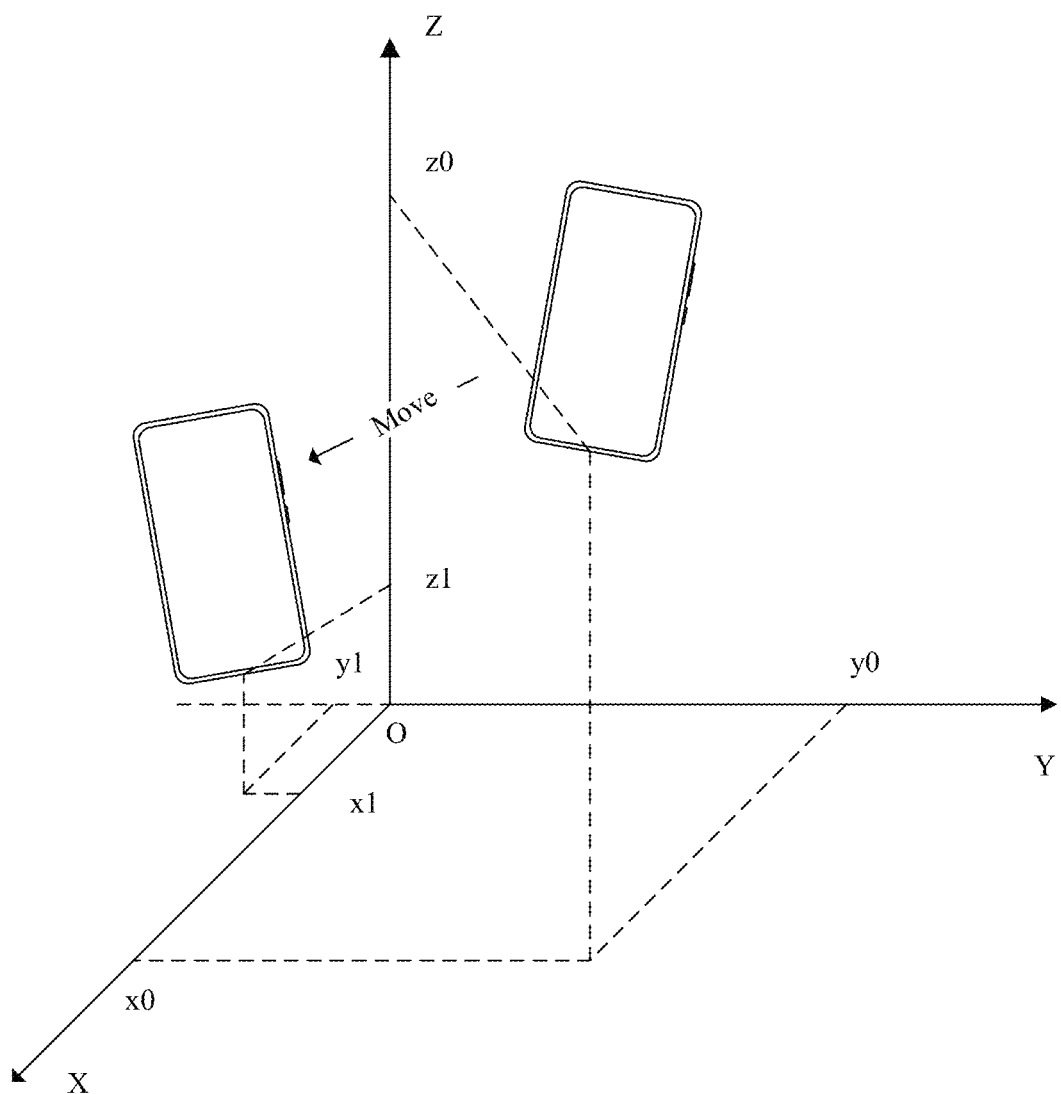
FIG. 9A and FIG. 9B are schematic diagrams of examples of determining a moving distance of a camera according to an embodiment of this application.
Figure 9B:
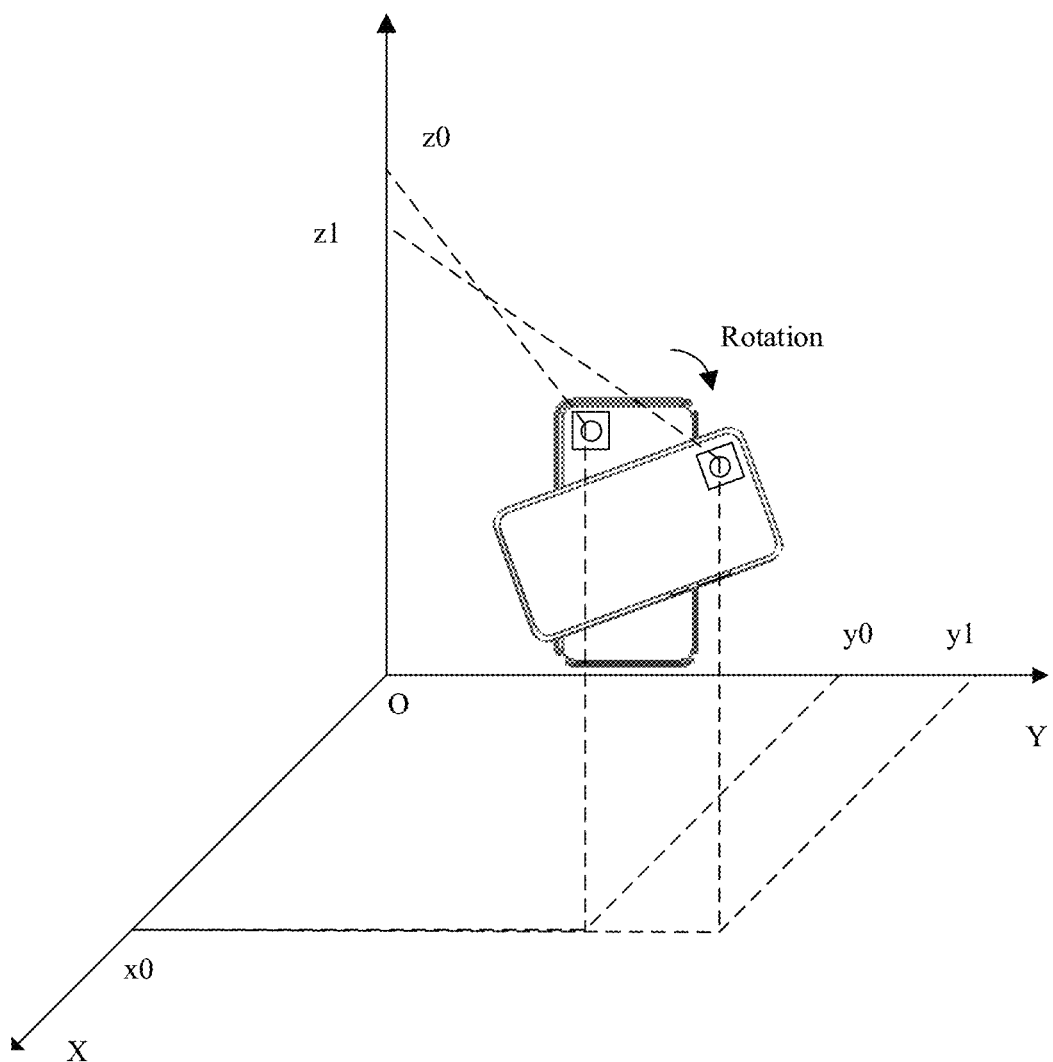

The following exemplarily describes a method for determining a moving distance of a camera with reference to FIG. 9A and FIG. 9B.

FIG. 9A and FIG. 9B are exemplary schematic diagrams of determining a moving distance of a camera according to an embodiment of this application.

As shown in FIG. 9A, an electronic device may establish a three-dimensional spatial coordinate system, and determine coordinates of the electronic device according to motion information. At any moment, the electronic device may determine that coordinates of the electronic device are $(x_0, y_0, z_0)$, and $(x_0, y_0, z_0)$ may be any value. At another moment, the electronic device may determine, based on the motion information, moving distances of the electronic device on the x-axis, the y-axis, and the z-axis in the three-dimensional spatial coordinate system, so as to determine that the coordinates of the electronic device are $(x_1, y_1, z_1)$.

After obtaining the coordinates at two moments, the electronic device may calculate a moving distance of the electronic device. For example, the moving distance of the electronic device may be calculated based on $\sqrt{(x_0-x_1)^2+(y_0-y_1)^2+(z_0-z_1)^2}$.

The electronic device may determine a speed and an acceleration of the electronic device on the x-axis, the y-axis, and the z-axis by using an apparatus such as a gyroscope and an acceleration sensor, and determine motion information such as an azimuth, a pitch, and a deflection angle of the electronic device. After the motion information is determined, the electronic device may determine, based on the motion information, a moving distance of the electronic device on the x-axis, the y-axis, and the z-axis in the three-dimensional spatial coordinate system.

As shown in FIG. 9B, at any moment, the electronic device may determine that coordinates of the camera are $(x_0, y_0, z_0)$. When the electronic device only rotates (for example, along a plane parallel to the ZOY plane), the coordinates of the camera are changed to $(x_1, y_1, z_1)$. In this case, the electronic device may determine a moving distance of the camera. For example, the electronic device determines coordinates of the camera based on the centroid of the camera, that is, coordinates of the centroid of the camera are $(x_0, y_0, z_0)$; or may be any point on the electronic device.

Alternatively, as also shown in FIG. 9B, when the rotation of the electronic device along the parallel with the ZOY plane changes to the azimuth angle of the camera, the angle at which the camera moves at the azimuth angle may be determined by means of calculation. Similarly, when the rotation of the electronic device parallel to the XOY plane changes to the pitch angle of the camera, the angle at which the camera moves in the pitch angle may be determined by means of calculation.

It may be considered that a camera gesture includes information such as an azimuth angle and a pitch angle.

It may be understood that, after determining the angle at which the camera moves on the pitch/horizontal plane, the electronic device may directly determine, by using the angle threshold, whether the camera moving distance is too large without calculating a space position change of the camera at two moments.

The following uses the content shown in Table 3 as an example to describe an example in which the electronic device directly determines, by using a camera gesture change, whether a camera moving distance is excessively large.

Table 3 shows an electronic device according to an embodiment of this application to determine, based on a camera gesture change, whether a camera moving distance is greater than a second threshold.

TABLE 3

| Focal length | Azimuth range | Pitch angle range |
|---|---|---|
| 0.5 | [−10°, 10°] | [−15°, 15°] |
| 1 | [−8°, 8°] | [−14°, 14°] |
| 5 | [−3°, 3°] | [−7°, 7°] |

As shown in Table 3, during image shooting, when a focal length of an electronic device is 0.5, and a change of an azimuth angle of the electronic device is greater than a positive or negative 10°, it is considered that a moving distance of a camera is determined to be greater than a second threshold. When the focal length of the electronic device is 1, if the change of the azimuth angle of the camera is greater than 8°, it is considered that the moving distance of the camera is greater than a second threshold. When the focal length of the electronic device is 5, if the change of the azimuth angle of the camera is greater than 3°, it is considered that the moving distance of the camera is greater than the second threshold.

Similarly, during image shooting, when the focal length of the electronic device is 0.5, and the change of the pitch angle of the electronic device is greater than 15°, it is considered that the moving distance of the camera is greater than the second threshold. When the focal length of the camera is 1, if the change of the pitch angle of the camera is greater than a positive or negative 14°, it is considered that the moving distance of the camera is greater than the second threshold. When the focal length of the camera is 5, if the change of the pitch angle of the camera is greater than 7°, it is considered that the moving distance of the camera is greater than the second threshold.

It should be noted that the azimuth/pitch angle range may not be symmetrical about 0°.

It should be noted that, when the electronic device photographs, an azimuth range may be less than a pitch angle azimuth when a focal length is the same.

With reference to Table 3, the foregoing example describes determining whether a camera moving distance is greater than the second threshold by independently determining a pitch angle and an azimuth angle. The following example describes a joint consideration of a pitch angle and an azimuth angle to determine whether the camera moving distance is greater than the second threshold.

The pitch angle and the azimuth angle may be jointly considered in a plurality of manners to determine whether the camera moving distance is greater than the second threshold.

For example, it may be considered that the azimuth range and the pitch range are approximately inversely proportional. When the electronic device always works at a focal length during photographing, the electronic device configures a second threshold as K. An azimuth change and a pitch angle change that are of the electronic device at a moment are A (absolute value) and B (absolute value) respectively. If A*B>K, the electronic device determines that the moving distance of the camera is greater than a second threshold. If A*B≤K, the electronic device determines that the moving distance of the camera is less than or equal to the second threshold.

When the electronic device switches the focal length, a value of K may also change. For example, a larger focal length indicates a smaller K value. A smaller focal length indicates a larger K value. Alternatively, for another example, when the focal length is relatively large or small, a value of K is relatively small. When the focal length is in a common focal segment such as 1 to 5, a value of K is large.

It should be noted that when the electronic device determines, based on the posture change of the camera, whether the moving distance of the camera is greater than the second threshold, not only a focal length used in photographing by the electronic device may be considered, but also depth of field information of an image from the photograph or preview frame may be considered.

It should be noted that coordinates determined by the electronic device may be coordinates of the electronic device as a whole (considered as a particle) in space. Alternatively, coordinates of the camera are directly determined as coordinates of the camera based on a relationship between the acceleration sensor inside the electronic device, the position of the gyroscope, and the position of the camera.

It may be understood that when the electronic device determines that coordinates of the electronic device are coordinates of the electronic device as a whole (considered as a particle) in space, a position change caused by translation of the electronic device may be determined. When determining that the coordinates of the electronic device are the coordinates of the camera, the electronic device may determine a position change caused by translation and rotation of the electronic device.

Alternatively, as shown in FIG. 5A and FIG. 5C, the electronic device may determine, by using various signal processing and data processing algorithms such as deep learning, artificial intelligence, feature matching, matching filtering, and time-frequency domain analysis, that content in the viewfinder frame in FIG. 5A is located in a lower part of the viewfinder frame in FIG. 5C. Further, it may be determined that the electronic device moves upward in space, or an elevation angle increases. The electronic device may further obtain depth information through analysis based on an image frame or a unit frame, so as to determine a moving distance of the camera on the electronic device.

S804: Configure thresholds of consecutive valid unit frames and consecutive invalid unit frames as a third threshold.

The electronic device configures the third threshold as the thresholds of consecutive valid unit frames and consecutive invalid unit frames, where the third threshold may be preset by the electronic device, or may be obtained by using a cloud server. Step S806 is performed.

The consecutive valid unit frames are time-continuous valid unit frames, and the consecutive invalid unit frames are time-continuous invalid unit frames.

Optionally, in some embodiments of this application, different thresholds may be configured for consecutive valid unit frames and consecutive invalid unit frames.

S805: Configure thresholds of consecutive valid unit frames and consecutive invalid unit frames as a fourth threshold.

The electronic device configures the fourth threshold as the threshold of consecutive valid unit frames and consecutive invalid unit frames, where the fourth threshold may be preset by the electronic device, or may be obtained by using a cloud server.

The fourth threshold is less than the third threshold. Step S806 is performed.

It may be understood that, in different cases, different thresholds are configured for consecutive valid unit frames and consecutive invalid unit frames. First, in a case in which a moving distance of a camera is relatively small and a data gap between the unit frame and a previous unit frame is relatively small, a possibility of a jump in a recommended scenario is reduced. Second, in a case in which a moving distance of the camera is relatively large, and in a case in which a data gap between the unit frame and a previous unit frame is relatively large, a threshold for a change of a recommended scenario is reduced, so that a new recommended scenario can be quickly and accurately determined.

S806: Determine whether a result output by AI scenario recognition based on the unit frame is none.

If the result output by AI scenario recognition based on the unit frame is none, step S807 is performed. If the result output by AI scenario recognition based on the unit frame is any scenario, step S808 is performed.

A process of performing AI scenario recognition based on the unit frame may occur in step S806 or before step S806.

S807: Determine whether a quantity of the consecutive invalid unit frames is greater than the threshold of the consecutive invalid unit frames.

If the quantity of the consecutive invalid unit frames is greater than the threshold of the consecutive invalid unit frames, step S809 is performed. If the quantity of the consecutive invalid unit frames is less than or equal to the threshold of the consecutive invalid unit frames, step S810 is performed.

S808: Determine that a quantity of consecutive valid unit frames is greater than the threshold of the consecutive valid unit frames, and target scenarios corresponding to the consecutive valid unit frames are consistent.

If the quantity of the consecutive valid unit frames is greater than the threshold of the consecutive valid unit frames, and the target scenarios corresponding to the consecutive valid unit frames are consistent, step S811 is performed. If the quantity of the consecutive valid unit frames is less than or equal to the threshold of the consecutive valid unit frames, or the target scenarios corresponding to the consecutive valid unit frames are inconsistent, step S810 is performed.

S809: Determine that the recommended scenario is none.

It is determined that the recommended scenario is none. When it is determined that the recommended scenario is none, related information of the recommended scenario may be displayed or not displayed on the home screen interface 201/preview box 202.

It may be understood that, because a quantity of consecutive invalid unit frames is greater than a threshold, and a result of output in an AI scenario of the unit frame is none, the recommended scenario may be configured as none.

It may be understood that configuring the recommended scenario as none is equivalent to configuring a buffer for the scenario recommendation function, and this can effectively avoid a jump of the recommended scenario caused by a short-term change of a mobile electronic device or a photographed object of the user.

S810: Determine that the recommended scenario is a target scenario corresponding to a previous unit frame.

It is determined that the recommended scenario is the recommended scenario corresponding to the previous unit frame. When it is determined that the recommended scenario is the target scenario corresponding to the previous unit frame, the target scenario corresponding to the previous unit frame may be displayed on the home screen interface 201/preview box 202.

Optionally, in some embodiments of this application, the recommended scenario may be determined according to target scenarios of a plurality of unit frames before the unit frame.

It may be understood that, if a quantity of consecutive valid unit frames is less than or equal to a threshold of consecutive unit frames, the user may be moving and rotating the electronic device, or content of a photographed picture is changing. In this case, a target scenario corresponding to the unit frame is not appropriate as a recommended scenario. Therefore, the target scenario corresponding to the previous unit frame is selected as the recommended scenario corresponding to the unit frame.

It may be understood that if a target scenario corresponding to a consecutive valid unit frame is inconsistent, it indicates that content of a photographed picture is being changed. In this case, a target scenario corresponding to the unit frame is not appropriate as a recommended scenario. Therefore, a target scenario corresponding to a previous unit frame is selected as a recommended scenario corresponding to the unit frame.

S811: Determine that the recommended scenario is a target scenario of the unit frame.

It is determined that the recommended scenario is the target scenario of the unit frame. When it is determined that the recommended scenario is the target scenario of the unit frame, the recommended scenario may be displayed on the home screen interface 201/preview box 202.

It may be understood that, because the quantity of valid unit frames is greater than the threshold of consecutive unit frames, and the target scenarios corresponding to the consecutive valid unit frames are consistent, it may be determined that the target scenario of the unit frame is the recommended scenario.

It may be understood that, because the recommended scenario is not changed all the time, that is, the photographed object and the electronic device are basically relatively still, a picture obtained by the electronic device is generally stable and unchanged, and the recommended scenario should not change, thereby ensuring coherence of the recommended scenario and improving user experience.

Apparently, the technical solutions corresponding to step S806, step S807, and step S809 include: when target scenarios corresponding to a plurality of unit frames are none, determining that the recommended scenario is none. First, this solution prevents a jump of the recommended scenario caused by existence of a target scenario corresponding to an individual unit frame. Second, in subsequent processing, image processing corresponding to the recommended scenario is performed on the unit frame or the image frame, thereby reducing calculation overheads.

Apparently, the technical solutions corresponding to step S806, step S807, and step S810 include: if target scenarios corresponding to only a few unit frames in current unit frames or image frames are none, and a target scenario corresponding to a latest obtained unit frame of the electronic device is none, determining that the recommended scenario is the target scenario corresponding to the previous unit frame. This solution prevents a jump of the recommended scenario caused because a target scenario corresponding to an individual unit frame is none. In addition, in subsequent processing, image processing corresponding to the recommended scenario is performed on the unit frame or the image frame, thereby reducing calculation overheads.

Apparently, the technical solutions corresponding to step S806, step S808, and step S810 include: when the target scenario corresponding to the current unit frame is inconsistent with the target scenario corresponding to the previous unit frame, determining that the recommended scenario is the target scenario corresponding to the previous unit frame, thereby preferentially ensuring continuity of the recommended scenario, and avoiding a jump of the recommended scenario caused by an AI scenario recognition error of the current unit frame.

Apparently, the technical solutions corresponding to step S806, step S808, and step S811 include: When the target scenario corresponding to the current unit frame is consistent with the target scenario corresponding to the previous unit frame, the target scenario may be switched to the recommended scenario, thereby ensuring smooth transition of the recommended scenario. It should be noted that, when the method for determining a recommended scenario provided in this embodiment of this application is implemented, when step S802 and step S803 are performed, a sequence between step S802 and step S803 may be interchanged, and only step S802 or step S803 may be performed. When performing step S802 and step S803, when the electronic device determines that the data gap between the unit frame and the previous unit frame is less than or equal to the first threshold, step S804 may be directly performed, and step S803 is not performed.

It should be noted that, when the method for determining a recommended scenario provided in this embodiment of this application is implemented, logic between step S802, step S803, step S804, and step S805 may be modified. When determining that the data gap between the unit frame and the previous unit frame is greater than the first threshold and the camera moving distance is greater than the second threshold, the electronic device performs step S805. When determining that the data gap between the unit frame and the previous unit frame is less than the first threshold or the camera moving distance is less than the second threshold, the electronic device performs step S804.

In the method for determining a recommended scenario provided in this embodiment of this application, a dynamic threshold is first configured by determining a size of a moving distance of a camera on an electronic device and a gap between a picture of a current unit frame and a picture of a previous unit frame. Second, the recommended scenario is determined based on the dynamic threshold and a target scenario corresponding to the picture of the current unit frame. According to the method for determining a recommended scenario provided in this embodiment of this application, information such as a target scenario of a unit frame and a relationship between a unit frame and a previous unit frame are fully considered, so that a recommended scenario can be more accurately determined.

Figure 10A:
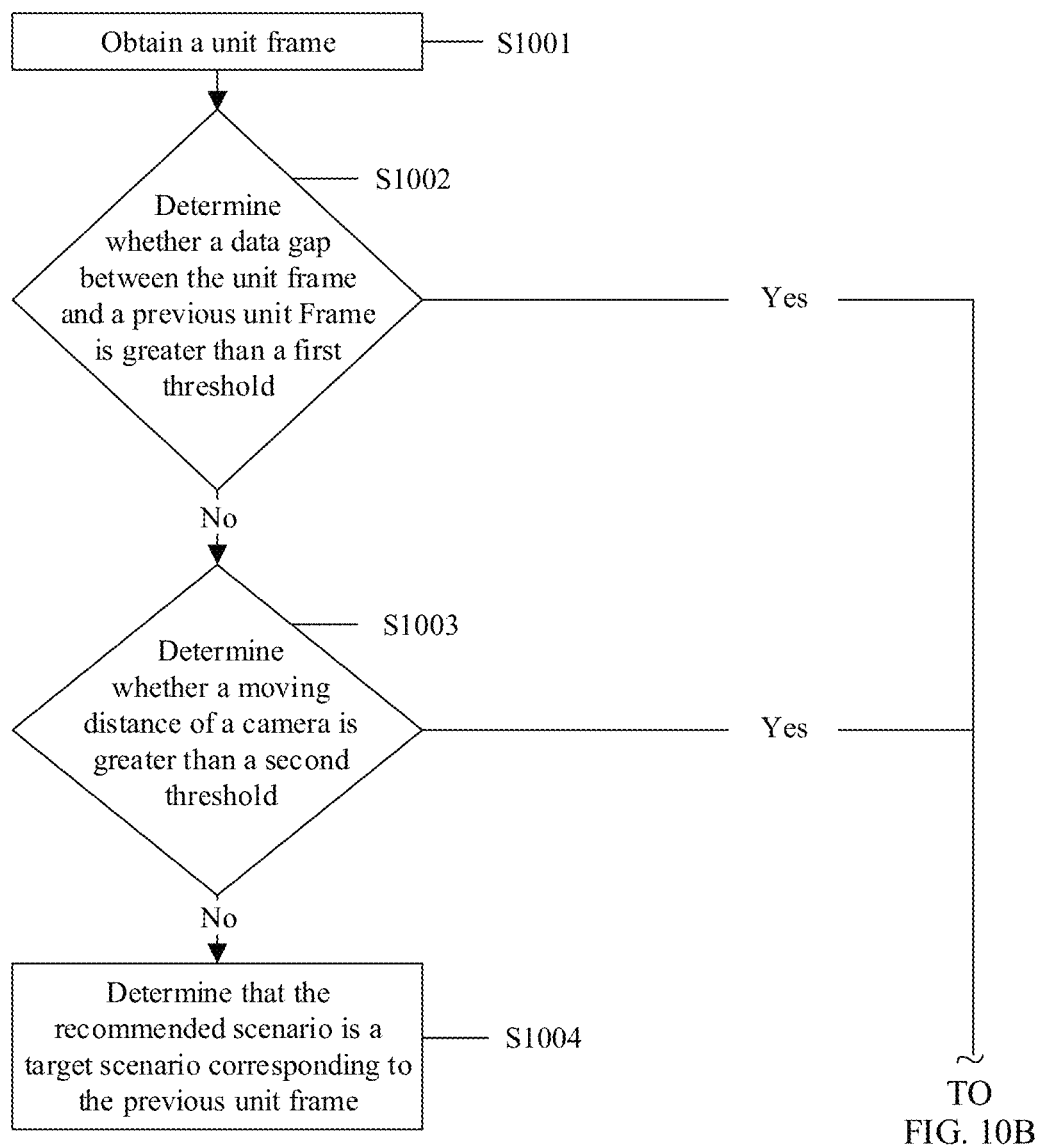
FIG. 10A and FIG. 10B are a schematic diagram of another example of a method for determining a recommended scenario according to an embodiment of this application.
Figure 10B:
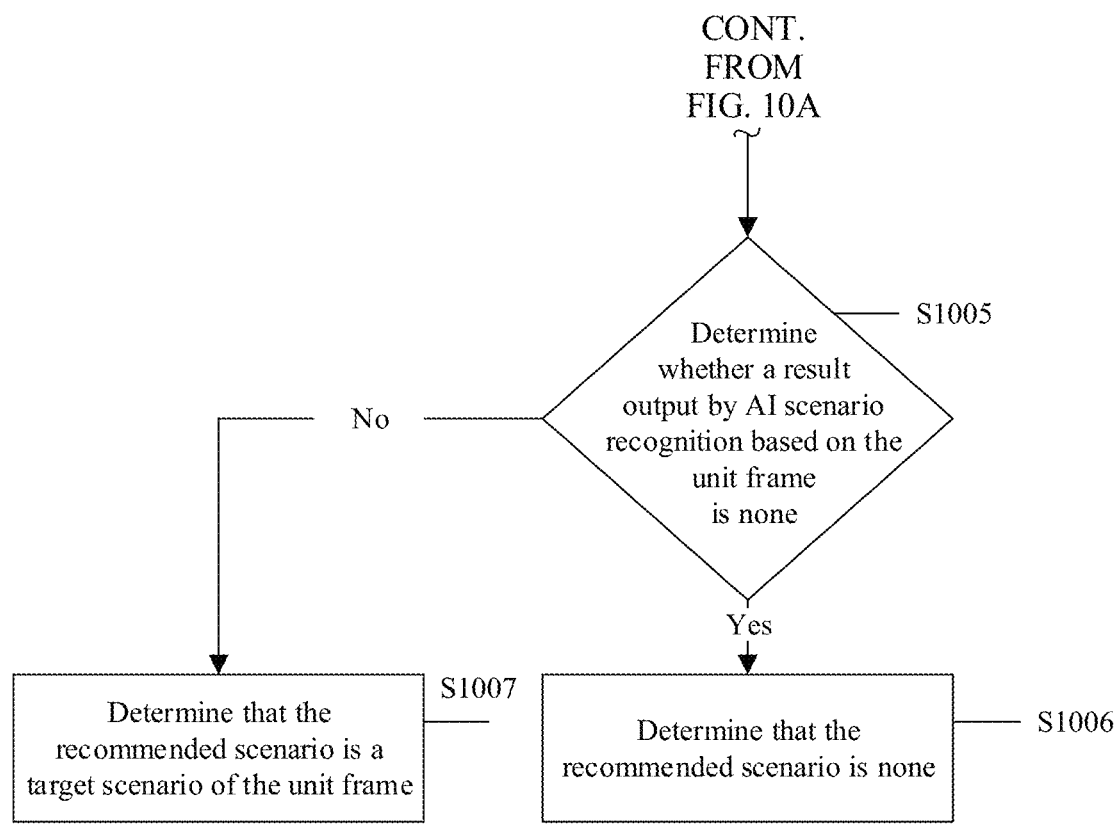

FIG. 10A and FIG. 10B are another exemplary schematic diagram of a method for determining a recommended scenario according to an embodiment of this application.

As shown in FIG. 10A and FIG. 10B, the method for determining a recommended scenario provided in this embodiment of this application includes the following steps.

S1001: Obtain a unit frame.

Specifically, the electronic device may obtain one or more consecutive/spaced image frames as one unit frame.

Different from step S801, AI scenario recognition of the unit frame may not be performed first, until step S1005 is performed.

Step S1002 is performed.

S1002: Determine whether a data gap between the unit frame and a previous unit frame is greater than a first threshold.

Specifically, after obtaining the unit frame, the electronic device may compare a data gap between the unit frame and the previous unit frame, and determine whether the gap is greater than the first threshold. If yes, step S1005 is performed. If no, step S1003 is performed.

For a method for comparing the data gap between the two unit frames, refer to a text description in step S803. Details are not described herein again.

S1003: Determine whether a camera moving distance is greater than a second threshold.

Specifically, it is determined whether the camera moving distance is greater than a second threshold. If yes, step S1005 is performed. If no, step S1004 is performed.

For a method for determining the moving distance of the camera, refer to the text description in step S804. Details are not described herein again.

S1004: Determine that a recommended scenario is a target scenario corresponding to the previous unit frame.

It is determined that the recommended scenario is a recommended scenario corresponding to the previous unit frame. When it is determined that the recommended scenario is the target scenario corresponding to the previous unit frame, the target scenario corresponding to the previous unit frame may be displayed on the home screen interface 201/preview box 202.

Optionally, in some embodiments of this application, the recommended scenario may be determined according to a target scenario of a plurality of unit frames before the unit frame.

S1005: Determine whether a result output by AI scenario recognition based on the unit frame is none.

Specifically, the AI scenario recognition is performed on the unit frame obtained in step S1001, and it is determined whether the result output by the AI scenario recognition is none. If the result output by the AI scenario recognition is none, step S1006 is performed. If the result output by the AI scenario recognition is not none, step S1007 is performed.

S1006: Determine that the recommended scenario is none.

Specifically, reference may be made to the text description in step S809, and details are not described herein again.

S1007: Determine that the recommended scenario is a target scenario of the unit frame.

Specifically, reference may be made to the text description in step S811, and details are not described herein again.

Different from the photographing scenario determining method shown in FIG. 4, the method for determining a recommended scenario shown in FIG. 10A and FIG. 10B does not need to perform AI scenario recognition on each frame of image frame or unit frame, thereby reducing computing load of the electronic device. In addition, the method for determining a recommended scenario shown in FIG. 10A and FIG. 10B further considers a relationship between a previous unit frame and the unit frame, which can effectively improve accuracy of a recommended scenario and improve user experience.

Compared with the method shown in FIG. 8A and FIG. 8B, in the method for determining a recommended scenario shown in FIG. 10A and FIG. 10B, in some cases, AI scenario recognition may be first not performed on the unit frame, so that calculation overheads of the electronic device are further reduced at a price of some accuracy.

It should be noted that the threshold of the consecutive valid unit frames and the threshold of the consecutive invalid unit frames may be configured in the method shown in FIG. 10A and FIG. 10B. For details, refer to the content shown in FIG. 8A and FIG. 8B and FIG. 10A and FIG. 10B. Details are not described again.

Figure 11A:
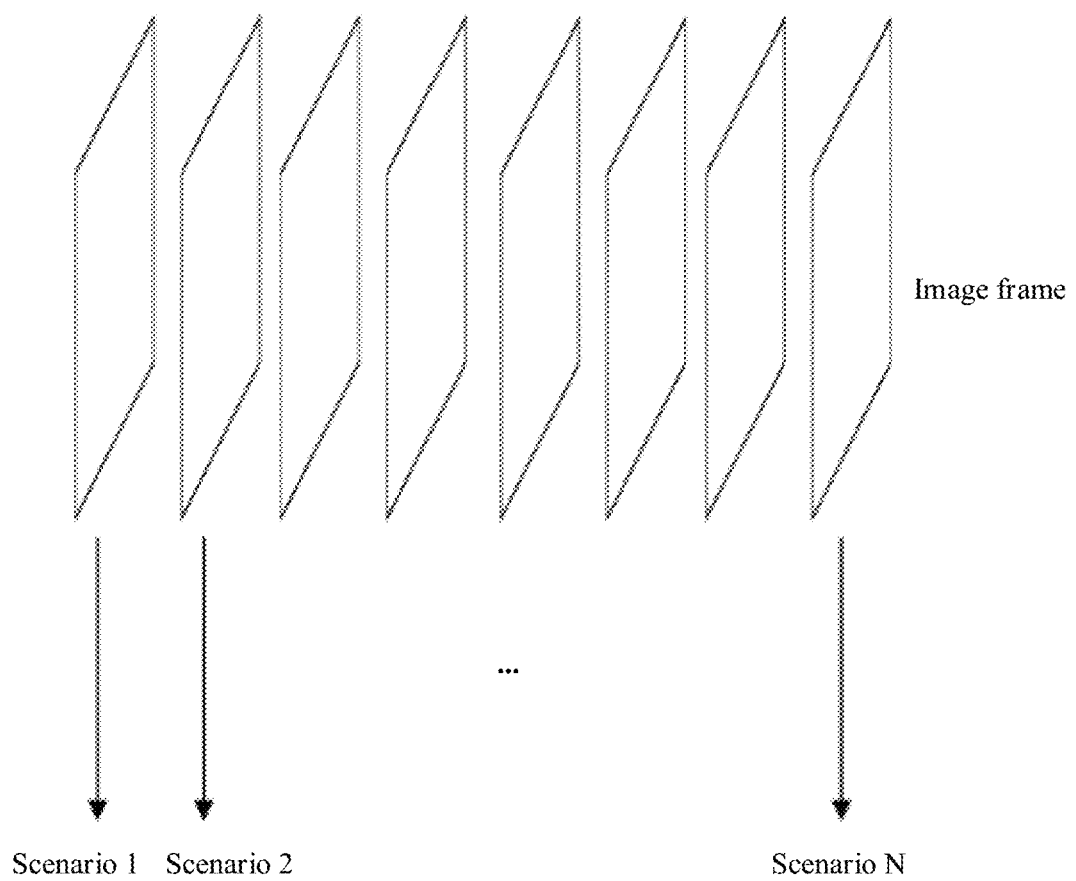
FIG. 11A is a schematic diagram of an example of the photographing scenario determining method shown in FIG. 4.

FIG. 11A is a schematic diagram of an example of the photographing scenario determining method shown in FIG. 4.

Figure 11B:
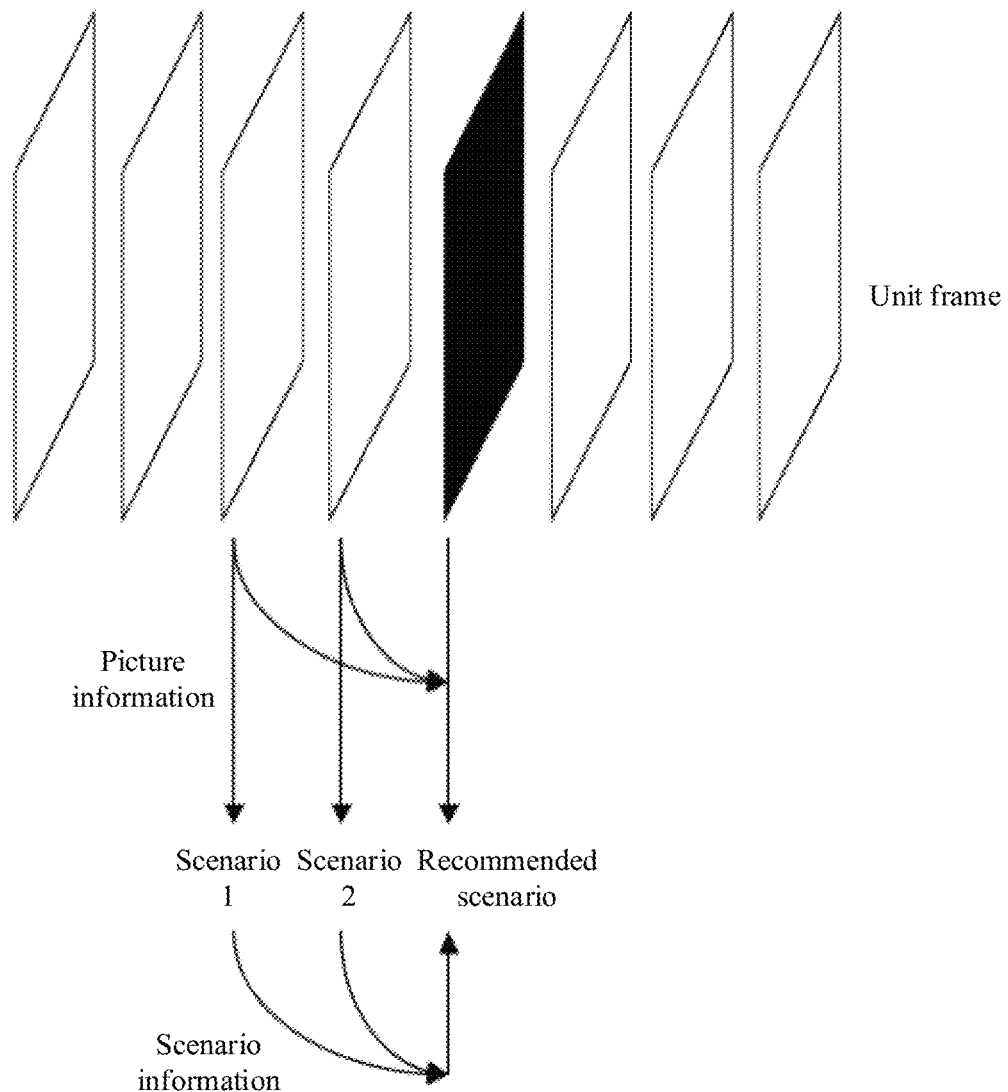
FIG. 11B is a schematic diagram of an example of the method for determining a recommended scenario shown in FIG. 8A and FIG. 8B and FIG. 10A and FIG. 10B.

FIG. 11B is a schematic diagram of an example of the method for determining a recommended scenario shown in FIG. 8A and FIG. 8B and FIG. 10A and FIG. 10B.

Apparently, by comparing content shown in FIG. 11A and FIG. 11B, a photographing scenario determining method determines a target scenario by independently analyzing a single image frame, so as to determine that the target scenario is a recommended scenario. Accuracy is completely determined by a capability of AI scenario recognition, and robustness is poor. However, in the method for determining a recommended scenario provided in the embodiment of this application, a relationship between the unit frame and a previous unit frame or a plurality of unit frames before the unit frame is fully considered, and a relationship between a target scenario of the unit frame and a target scenario of a previous unit frame or a plurality of unit frames before the unit frame is considered. Therefore, a recommended scenario is determined comprehensively, and accuracy is relatively high, which helps improve user experience.

The following exemplarily describes a scenario in which a recommended scenario method is determined according to an embodiment of this application.

Table 4 is an example of a table of a scenario for determining a recommended scenario method according to an embodiment of this application.

TABLE 4

| | Photographing content | |
|---|---|---|
| Scenario | Character | Character and pattern |
| Target scenario | Character scenario | Pattern scenario |
| Recommended scenario | Character scenario | Character scenario/pattern scenario |

In a photographing process, when the photographed content changes, that is, the content corresponding to the viewfinder frame changes, the recommended scenario and the target scenario may be inconsistent.

For example, in a photographing process, a photographed subject is always human from a first moment to a second moment. From the second moment to a third moment, the photographed subject is a pattern. From the third moment to a fourth moment, the photographed subject is human. Specifically, this is as shown in FIG. 12A and FIG. 12B.

Figure 12A:
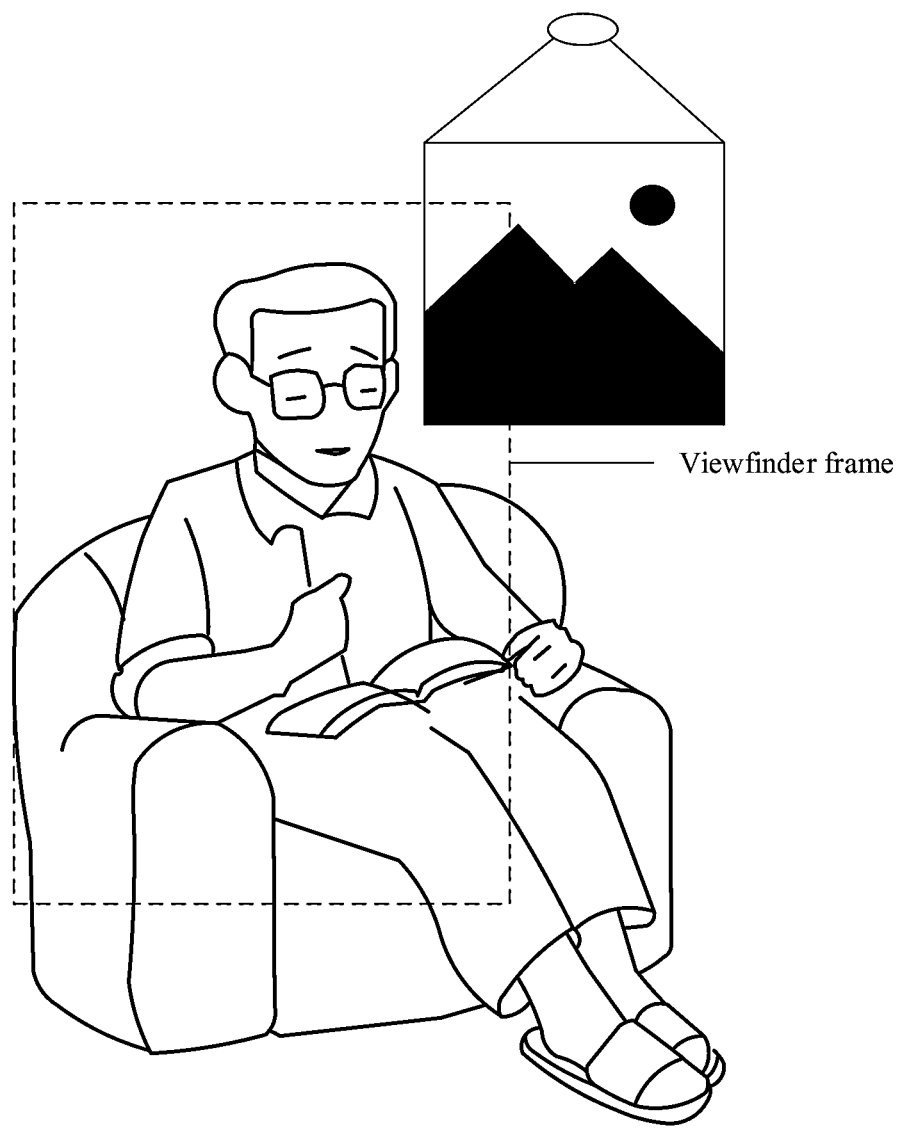
FIG. 12A and FIG. 12B are schematic diagrams of another example of a photographing background according to an embodiment of this application.
Figure 12B:
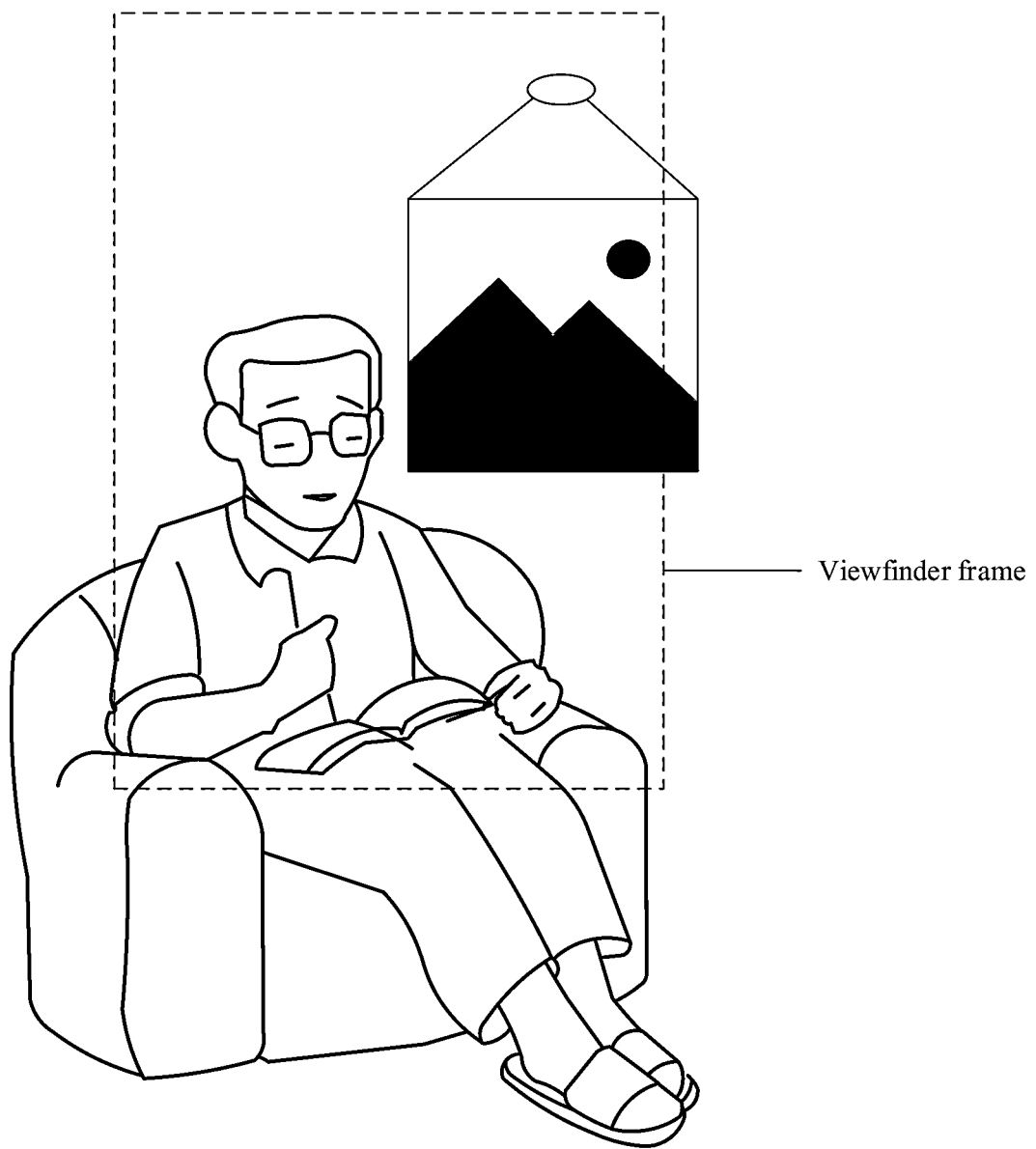

FIG. 12A and FIG. 12B are another exemplary schematic diagram of a photographing background according to an embodiment of this application.

As shown in FIG. 12A and Table 2, from the first moment to the second moment, a person corresponding to a unit frame obtained by the electronic device is relatively complete. Therefore, the target scenario is determined as a character, and the current recommended scenario is considered as a character scenario.

As shown in FIG. 12B and Table 2, from the second moment to the third moment, a person corresponding to a unit frame obtained by the electronic device is relatively incomplete, and a wall painting is relatively complete. Therefore, the target scenario is determined as a pattern. If the time interval between the second moment and the third moment is relatively short, and corresponding to step S808 and step S810, target scenarios corresponding to unit frames from the first moment to the third moment are inconsistent, the recommended scenario is a target scenario corresponding to the unit frame from the first moment to the second moment, that is, a character scenario is the recommended scenario. After the recommended scenario is determined, the recommended scenario may be displayed on the home screen interface 201/preview box 202. For a method for displaying the recommended scenario on the home screen interface 201/preview box 202, refer to the text descriptions corresponding to FIG. 5A and FIG. 5B.

If the time interval between the second moment and the third moment is relatively long, corresponding to step S808 and step S810, in the unit frames from the first moment to the third moment, a quantity of unit frames whose target scenario is a pattern is greater than the threshold of consecutive valid unit frames, and scenarios corresponding to these unit frames are a target scenario, that is, the electronic device determines that the recommended scenario is a pattern scenario, and the recommended scenario may be displayed on the home screen interface 201/preview box 202.

Finally, the electronic device provided in this embodiment of this application is described.

Figure 13:
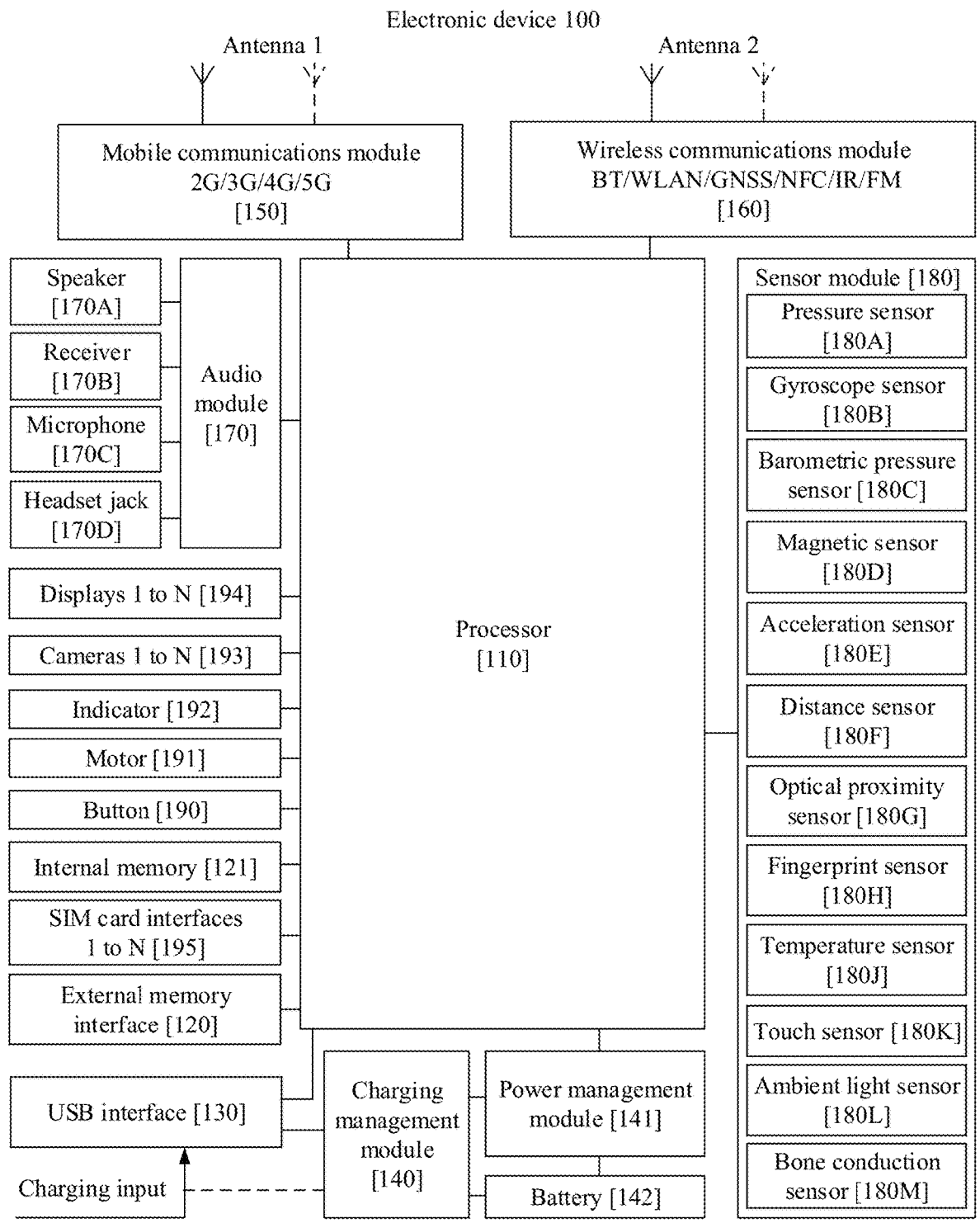
FIG. 13 is a schematic diagram of an example of a hardware structure of an electronic device 100 according to an embodiment of this application.

FIG. 13 is a schematic diagram of an example of a hardware structure of an electronic device 100 according to an embodiment of this application.

The electronic device 100 may be a mobile phone, a tablet computer, a desktop computer, a laptop computer, a handheld computer, a laptop computer, a ultra-mobile personal computer (ultra-mobile personal computer, UMPC), a netbook, and a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, and/or a smart urban device. A specific type of the electronic device is not specifically limited in this embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that the structure shown in this embodiment of the application does not constitute a specific limitation on the electronic device 100. In other embodiments of this application, the electronic device 100 may include more or fewer components than those shown in the figure, or some components may be combined, or some components may be split, or components are arranged in different manners. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit. NPU). Different processing units may be independent components, or may be integrated into one or more processors.

The controller may generate an operation control signal based on an instruction operation code and a time sequence signal, to control instruction reading and instruction execution.

A memory may be disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or data again, the instruction or data may be directly invoked from the memory. Therefore, repeated access is avoided, a waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, and/or a universal serial bus (universal serial bus, USB) interface, and the like.

The I2C interface is a two-way synchronous serial bus, including a serial data line (serial data line, SDA) and a derail clock line (derail clock line, SCL). In some embodiments, the processor 110 may include a plurality of groups of I2C buses. The processor 110 may be coupled to the touch sensor 180K, a charger, a flash, the camera 193, or the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 by using an I2S interface, to implement a function of answering a call by using a Bluetooth headset.

The PCM interface can also be used for audio communication, sampling, quantifying and coding analog signals. In some embodiments, the audio module 170 and the wireless communication module 160 may be coupled through a PCM bus interface. In some embodiments, the audio module 170 may also transmit an audio signal to the wireless communications module 160 by using a PCM interface, so as to implement a function of answering a call by using a Bluetooth headset. Both the I2S interface and the PCM interface can be used for audio communication.

The UART interface is a universal serial data bus used for asynchronous communication. The bus may be a bidirectional communication bus. The bus converts data to be transmitted between serial communication and parallel communication. In some embodiments, the UART interface is generally configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communications module 160 through a UART interface, so as to implement a function of playing music by using a Bluetooth headset.

The MIPI interface may be configured to connect the processor 110 to a peripheral component such as the display 194 and the camera 193. The MIPI interface includes a camera serial interface (camera serial interface, CSI), a display serial interface (display serial interface, DSI), and the like. In some embodiments, the processor 110 and the camera 193 communicate with each other by using a CSI interface, so as to implement a photographing function of the electronic device 100. The processor 110 communicates with the display 194 by using the DSI interface, so as to implement a display function of the electronic device 100.

The GPIO interface can be configured through software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface can also be configured as an I2C interface, an I2S interface, a UART interface, and an MIPI interface.

The USB port 130 is an interface that meets a USB standard specification, and may be specifically a Mini USB port, a Micro USB port, a USB Type C port, or the like. The USB port 130 may be configured to connect to a charger to charge the electronic device 100, may be configured to transmit data between the electronic device 100 and a peripheral device, and may further be configured to connect to a headset to play audio by using the headset. The port may be further configured to connect to another electronic device, such as an AR device.

It may be understood that an interface connection relationship between the modules that is shown in this embodiment of the application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger, or may be a wired charger. In some wired charging embodiments, the charging management module 140 may receive a charging input of a wired charger through the USB port 130. In some wireless charging embodiments, the charging management module 140 may receive a wireless charging input by using a wireless charging coil of the electronic device 100. While charging the battery 142, the charging management module 140 may further supply power to the electronic device by using the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health state (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover a single or a plurality of communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The mobile communications module 150 may provide a wireless communication solution, including 2G/3G/4G/5G or the like, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal obtained after modulation by the modem processor, and convert the signal into an electromagnetic wave through the antenna 1 for radiation. In some embodiments, at least a part of the functional modules of the mobile communications module 150 may be disposed in the processor 110. In some embodiments, at least a part of the functional modules of the mobile communications module 150 may be disposed in the same device as at least a part of the modules of the processor 110.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video on the display 194. In some embodiments, the modem processor may be an independent device. In other embodiments, the modem processor may be independent of the processor 110 and disposed in the same device as the mobile communications module 150 or other functional modules.

The wireless communications module 160 may provide a solution to wireless communication applied to the electronic device 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components that integrate at least one communication processing module. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometrical calculation, and is configured to perform graphics rendering. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like. In this embodiment of this application, when photographing, the electronic device 100 may display real-time photographed content and a recommended scenario corresponding to the photographed content on the display 194.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 100, for example, image recognition, facial recognition, voice recognition, and text understanding.

In this embodiment of this application, the electronic device 100 may input any two consecutive/inconsecutive unit frames into the CPU/GPU/NPU to determine whether a data gap between the two unit frames is greater than a threshold.

In this embodiment of this application, the electronic device 100 may input any unit frame into the CPU/NPU/GPU, and calculate and determine a result of the AI scenario recognition output of the unit frame, that is, determine a target scenario of the photographed content.

In this embodiment of this application, the electronic device may input any unit frame into the CPU/NPU/GPU, determine a type and a quantity of objects in the unit frame, and calculate a gap between the two unit frames.

The internal memory 121 may include one or more random access memories (random access memory, RAM) and one or more non-volatile memory (non-volatile memory; NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as DDR5 SDRAM), and the like.

The non-volatile memory may include a disk storage component and a flash memory (flash memory).

The flash memory may be divided according to an operating principle, including NOR FLASH, NAND FLASH, 3D NAND FLASH, and the like. The flash memory may include a single-order storage unit (single-level cell, SLC), a multi-order storage unit (multi-level cell, MLC), a third-order storage unit (triple-level cell, TLC), a fourth-order storage unit (quad-level cell, QLC), and the like. The flash memory may be divided according to a storage specification, including general flash storage (English: Universal flash storage, UFS), embedded multi media Card (embedded multi media Card, eMMC), and the like.

The random access memory may be directly read and written by the processor 110, and may be configured to store an executable program (for example, a machine instruction) of an operating system or another running program, and may be further configured to store data of a user and an application program.

The non-volatile memory may also store an executable program, data for storing a user and an application program, and the like, and may be loaded into the random access memory in advance, so that the processor 110 directly reads and writes.

The external memory interface 120 may be configured to connect to an external non-volatile memory, so as to implement an extended storage capability of the electronic device 100. The external storage card communicates with the processor 110 through the external memory interface 120, to implement a data storage function. For example, files such as music and a video are stored in the external memory card.

The electronic device 100 may implement audio functions by using the audio module 170, the speaker 170A, the receiver 170B, the microphone 270C, the headset jack 270D, the application processor, and the like. The audio functions are, for example, music playback and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device 100 may listen to music or listen to a hands-free call by using the speaker 170A.

The receiver 170B, also referred to as an "earpiece", is configured to convert an audio electrical signal into a sound signal. When the electronic device 100 answers a call or voice message, the receiver 170B may be placed near the human ear to answer the voice.

The microphone 170C, also referred to as a "mike" or a "mic", is configured to convert a sound signal into an electrical signal. When making a call or sending a voice message, the user may sound by using a mouth near the microphone 170C, and input a sound signal to the microphone 170C. The electronic device 100 may set at least one microphone 170C. In other embodiments, the electronic device 100 may set two microphones 170C, and in addition to collecting a sound signal, a noise reduction function may be implemented. In some other embodiments, the electronic device may be provided with three, four, or more microphones 170C, so as to collect a sound signal, reduce noise, identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 100 determines strength of the pressure based on the change of the capacitance. When a touch operation is performed on the display 194, the electronic device 100 detects strength of the touch operation by using the pressure sensor 180A. The electronic device 100 may calculate a touch position based on a detected signal of the pressure sensor 180A. In some embodiments, touch operations that are performed at a same touch location but have different touch operation strength may correspond to different operation instructions. For example, when a touch operation whose touch operation strength is less than a first pressure threshold acts on the SMS application icon, an instruction for viewing the SMS message is executed. When a touch operation whose touch operation strength is greater than or equal to a first pressure threshold is performed on the SMS message application icon, an instruction for creating a new SMS message is executed.

The gyroscope sensor 180B may be configured to determine a motion posture of the electronic device 100. In some embodiments, the angular velocity of the electronic device 100 around three axes (i.e., x, y, and z axes) may be determined by using the gyroscope sensor 180B. The gyroscope sensor 180B may be configured to shoot anti-shake. For example, when a shutter is pressed, the gyroscope sensor 180B detects an angle of jitter of the electronic device 100, and calculates, according to the angle meter, a distance that needs to be compensated by the lens module, so that the lens cancels jitter of the electronic device 100 by using a reverse motion, thereby implementing anti-jitter. The gyroscope sensor 180B may be further configured to navigate and sense a game scenario.

The acceleration sensor 180E may detect the acceleration of the electronic device 100 in all directions (generally three axes). When the electronic device 100 is still, a gravity size and a direction may be detected. The device may be further configured to identify an electronic device posture, and is applied to applications such as horizontal and vertical screen switching and a pacemaker.

The electronic device 100 may determine motion information of the electronic device based on the acceleration sensor 180E/gyroscope sensor 180B, and further determine a moving distance of the camera based on the motion information. The barometric pressure sensor 180C is used to measure the barometric pressure. In some embodiments, the electronic device 100 calculates an altitude by using the atmospheric pressure value measured by the atmospheric pressure sensor 180C, and assists in positioning and navigation.

The magnetic sensor 180D includes a Hall sensor. The electronic device 100 may detect opening and closing of the flip cover sleeve by using the magnetic sensor 180D. In some embodiments, when the electronic device 100 is a flip-flop, the electronic device 100 may detect opening and closing of the flip-flop according to the magnetic sensor 180D. Further, a feature such as automatic unlocking of the flip cover is set according to the detected open/close state of the jacket or the open/close state of the flip cover.

The distance sensor 180F is configured to measure a distance. The electronic device 100 may measure a distance by using infrared or laser. In some embodiments, the photographing scenario, the electronic device 100 may use the distance sensor 180F to measure distance to implement fast focusing.

The proximity light sensor 180G may include, for example, a light emitting diode (LED) and a photodetector, for example, a photodiode. The light emitting diode may be an infrared light emitting diode. The electronic device 100 emits infrared light by using a light emitting diode. The electronic device 100 detects infrared reflected light from a nearby object by using a photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the proximity optical sensor 180G, that the user handles the electronic device 100 close to the ear, so as to automatically turn off the screen to save power. The proximity light sensor 180G may also be used in a sheath mode, and the pocket mode is automatically unlocked and locked.

The ambient light sensor 180L is configured to sense ambient light brightness. The electronic device 100 may adaptively adjust the brightness of the display screen 194 according to the perceived ambient brightness. The ambient light sensor 180L may also be configured to automatically adjust a white balance during photographing. The ambient light sensor 180L may further cooperate with the proximity light sensor 180G to detect whether the electronic device 100 is in the pocket to prevent a false touch.

The fingerprint sensor 180H is configured to collect a fingerprint. The electronic device 100 may implement fingerprint unlocking, access application lock, fingerprint photographing, and fingerprint receiving by using the collected fingerprint feature.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds the threshold, the electronic device 100 performs performance reduction of the processor located near the temperature sensor 180J, so as to reduce power consumption and implement thermal protection. In other embodiments, when the temperature is below another threshold, the electronic device 100 heats the battery 142 to avoid abnormal shutdown of the electronic device 100 due to low temperature. In other embodiments, when the temperature is below another threshold, the electronic device 100 boosts the output voltage of the battery 142 to avoid abnormal shutdown due to low temperature.

The touch sensor 180K is also referred to as a "touch device". The touch sensor 180K may be disposed on the display screen 194. The touch sensor 180K and the display 194 form a touchscreen, which is also referred to as a "touchscreen". The touch sensor 180K is configured to detect a touch operation performed on or near the touch sensor 280K. The touch sensor may transfer the detected touch operation to the application processor to determine a touch event type. A visual output related to a touch operation may be provided by using the display 194. In some other embodiments, the touch sensor 180K may alternatively be disposed on a surface of the electronic device 100 at a position different from a position of the display 194.

The bone conduction sensor 180M may obtain a vibration signal. In some embodiments, the bone conduction sensor 180M may obtain a vibration signal of a human acoustic vibration bone block. The bone conduction sensor 180M may also contact a human pulse to receive a blood pressure beat signal. In some embodiments, the bone conduction sensor 180M may also be disposed in the headset to combine with the bone conduction headset. The audio module 170 may parse out a voice signal based on the vibration signal that is of the acoustic vibration bone block and obtained by the bone conduction sensor 180M, to implement a voice function. The application processor may parse the heart rate information based on the blood pressure jitter signal obtained by the bone conduction sensor 180M, to implement a heart rate detection function.

The button 190 includes a power-on button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration prompt. The motor 191 may be used for an incoming call vibration prompt, or may be used for touch vibration feedback. For example, a touch operation performed on different applications (for example, photographing and audio playback) may correspond to different vibration feedback effects. The motor 191 may also correspond to different vibration feedback effects when applied to touch operations in different areas of the display screen 194. Different application scenarios (for example, time reminders, receiving information, an alarm clock, and a game) may also correspond to different vibration feedback effects. The touch vibration feedback effect may further support customization.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195, so that the SIM card is in contact with or separated from the electronic device 100. The electronic device 100 may support one or N SIM card interfaces, where N is a positive integer greater than 1. The SIM card interface 195 may support a Nano SIM card, a Micro SIM card, a SIM card, and the like. The same SIM card interface 195 may be connected to a plurality of cards at the same time. Types of the plurality of cards may be the same or different. The SIM card interface 195 may be compatible with different types of SIM cards. The SIM card interface 195 may also be compatible with an external storage card. The electronic device 100 interacts with a network by using a SIM card, so as to implement functions such as a call and data communication.

In some embodiments, the electronic device 100 uses an eSIM, that is, an embedded SIM card. The eSIM card may be embedded in the electronic device 100, and cannot be separated from the electronic device 100.

A software system of the electronic device 100 may use a hierarchical architecture, an event-driven architecture, a micronucleus architecture, a microservice architecture, or a cloud architecture. In this embodiment of the application, an Android R system of a layered architecture is used as an example to illustrate a software structure of the electronic device 100.

Figure 14:
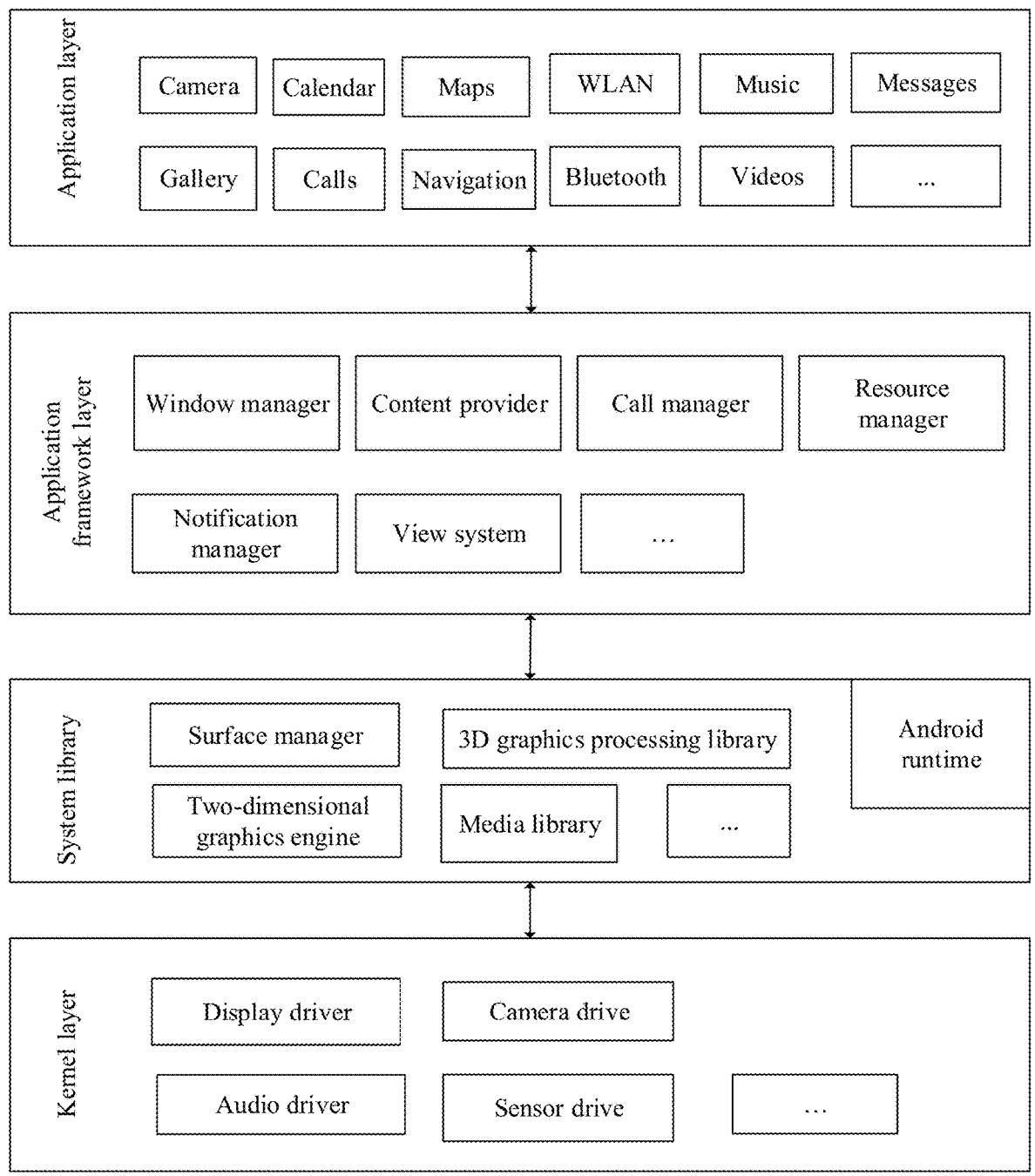
FIG. 14 is a schematic diagram of an example of a software structure of an electronic device 100 according to an embodiment of this application.

FIG. 14 is a schematic diagram of an example of a software structure of an electronic device 100 according to an embodiment of this application.

In the layered architecture, software is divided into several layers, and each layer has a clear role and task. Layers communicate with each other by using software interfaces. In some embodiments, the Android system is divided into four layers: an application layer, an application framework layer, an Android runtime (Android runtime) and a system library; and a core layer. The application layer may include a series of application packages.

As shown in FIG. 14, the application packages may include applications such as Camera, Gallery, Calendar, Calls, Maps, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 14, the application framework layer may include a window manager, a content provider, a view system, a phone manager, a resource manager, a notification manager, and the like.

The window manager is used to manage window programs. The window manager may obtain a size of a display, determine whether there is a status bar, lock a screen, take a screenshot, and the like.

The content provider is used to store and obtain data and make the data accessible to an application. The data may include a video, an image, audio, calls that are made and received, browsing history and bookmarks, a phonebook, and the like.

The view system includes visual controls, such as a control for displaying text, a control for displaying pictures, and the like. The view system may be used to construct an application. A display interface may include one or more views. For example, a display interface including a message notification icon may include a view for displaying text and a view for displaying pictures.

The phone manager is used to provide a communication function of the electronic device 100, for example, call status management (including answering, declining, or the like).

The resource manager provides various resources for the application, such as a localized string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is used to notify download completion, message reminder, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or an indicator light blinks.

The Android Runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run in the virtual machine. The virtual machine executes java files at the application layer and the application framework layer as binary files. The virtual machine is used to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports play back and recording in various commonly used audio and video formats, still image files, and the like. The media library may support a plurality of audio and video coding formats, such as: MPEG4, H.264, MP3, AAC, AMR, JPG, PNG, and the like.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The scenario recommendation method provided in this embodiment of this application may be located in a view system at a system library or an application framework layer, and an external exposed interface of the scenario recommendation method may be invoked by an application program at an application layer. The application program may determine a recommended scenario of any image by using the interface. The image may be from camera-driven real-time picture stream data, or may be a non-real-time picture file stored inside the electronic device.

Used in the foregoing embodiment, according to the context, the term "when . . . "Time" may be interpreted as "if . . . " Or "in . . . After "or" in response to determining . . . " Or "in response to detecting . . . ". Similarly, according to the context, the phrase "determining . . . Time "or" If detected (condition or event stated) "may be interpreted as meaning" If determined . . . " Or "in response to determining . . . " Or "at the time of detection (the stated condition or event)" or "in response to detection (the stated condition or event)".

In the foregoing embodiments, software, hardware, firmware, or any combination thereof may be implemented in whole or in part. When software is used, it may be implemented in full or in part in the form of a computer program product. The computer program product includes one or more computer instructions. When the computer program instruction is loaded and executed on the computer, a procedure or a function according to an embodiment of this application is completely or partially generated. The computer may be a general-purpose computer, a dedicated computer, a computer network, or another programmable apparatus. The computer instruction may be stored in a computer readable storage medium or transmitted from one computer readable storage medium to another computer readable storage medium. For example, the computer instruction may be transmitted from one website site, computer, server, or data center to another website site, computer, server, or data center in a wired (such as coaxial cable, optical fiber, digital subscriber line) or wireless (such as infrared, wireless, microwave) manner. The computer readable storage medium may be any available medium accessible by a computer, or a data storage device such as a server or a data center that includes one or more available media integrations. The available medium may be a magnetic medium (for example, a floppy disk, a hard disk, or a magnetic tape), an optical medium (for example, a DVD), or a semiconductor medium (for example, a solid state disk).

A person of ordinary skill in the art may understand that all or some of the procedures in the methods in the foregoing embodiments are implemented. The procedure may be completed by a computer program instructing related hardware. The program may be stored in a computer readable storage medium. When the program is executed, the procedure in the foregoing method embodiments may be included. The foregoing storage medium includes any medium that can store program code, such as a ROM or a random storage memory RAM, a magnetic disk, or an optical disc.

The foregoing descriptions are merely specific implementations of the application, but are not intended to limit the protection scope of the application. Any change or replacement readily figured out by a person skilled in the art within the technical scope disclosed in the application shall fall within the protection scope of the application. Therefore, the protection scope of the application shall be subject to the protection scope of the claims.

What is claimed is:

1. A method for determining a recommended scenario, comprising:
    displaying, by an electronic device, a first interface at a first moment, wherein the first interface comprises a preview box and a first mark, the preview box displays a first image captured by a camera of the electronic device in real time, and the first mark is used to identify a scenario corresponding to the first image, and wherein the electronic device is in a first geographical location, and the first geographical location is used to identify a geographical location in which the electronic device is located at the first moment; and
    displaying, by the electronic device, a second interface at a second moment, wherein the second interface comprises the preview box and a second mark, the preview box displays a second image captured by the camera of the electronic device in real time, the second mark is used to identify a scenario corresponding to the second image, the second image is different from the first image, and the second moment is different from the first moment, and wherein at the second moment, the electronic device is in a second geographical location, and the second geographical location is used to identify the geographical location in which the electronic device is located at the second moment; wherein
    in response to the electronic device meeting a first preset condition, the second mark is displayed the same as the first mark, wherein the first preset condition is that a distance between the first geographical location and the second geographical location is less than or equal to a second preset threshold.

2. The method according to claim 1, wherein
    at the first moment, the electronic device is in a first posture, and the first posture comprises an azimuth and a pitch angle of the electronic device at the first moment;
    at the second moment, the electronic device is in a second posture, and the second posture comprises an azimuth and a pitch angle of the electronic device at the second moment; and
    in another instance, the first preset condition is:
    a difference between the azimuth of the electronic device at the first moment and the azimuth of the electronic device at the second moment is less than or equal to a first threshold, and a difference between the pitch angle of the electronic device at the first moment and the pitch angle of the electronic device at the second moment is less than or equal to a second threshold; or
    a product of a difference between the azimuth of the electronic device at the first moment and the azimuth of the electronic device at the second moment and a difference between the pitch angle of the electronic device at the first moment and the pitch angle of the electronic device at the second moment is less than a third threshold.

3. The method according to claim 1, wherein before the displaying, by the electronic device, the second interface at the second moment, wherein the second interface comprises the preview box and the second mark, the method further comprises:
    determining, by the electronic device, a target scenario corresponding to the second image, wherein
    the target scenario corresponding to the second image is different from a target scenario corresponding to the first image.

4. The method according to claim 1, wherein before the displaying, by the electronic device, the second interface at the second moment, wherein the second interface comprises the preview box and the second mark, the method further comprises:
    determining, by the electronic device, that the second image has no corresponding target scenario.

5. The method according to claim 1, wherein
    in response to when the electronic device does not meet the first preset condition, the second mark is displayed different from the first mark.

6. The method according to claim 1, wherein:
    before the second moment, when scenarios are determined respectively for each of a plurality of images collected by the electronic device are the same, and when the electronic device does not meet the first preset condition, the second mark is displayed different from the first mark.

7. The method according to claim 1, wherein the method further comprises:
    in response to the electronic device not meeting the first preset condition, and in response to the electronic device determining that the second image has no corresponding target scenario, hiding or skipping displaying, by the electronic device, of the second mark.

8. The method according to claim 1, wherein the method further comprises:
    before the second moment, in response to a plurality of images collected by the electronic device having no corresponding scenario determined for each of the plurality of images, and the electronic device not meeting the first preset condition, hiding or skipping displaying, by the electronic device, of the second mark.

9. A method for determining a recommended scenario, comprising:
displaying, by an electronic device, a first interface at a first moment, wherein the first interface comprises a preview box and a first mark, the preview box displays a first image captured by a camera of the electronic device in real time, and the first mark is used to identify a scenario corresponding to the first image, and at the first moment, the electronic device is in a first posture comprising an azimuth and a pitch angle of the electronic device at the first moment; and
displaying, by the electronic device, a second interface at a second moment, wherein the second interface comprises the preview box and a second mark, the preview box displays a second image captured by the camera of the electronic device in real time, the second mark is used to identify a scenario corresponding to the second image, the second image is different from the first image, and the second moment is different from the first moment, and at the second moment, the electronic device is in a second posture, and the second posture comprises an azimuth and a pitch angle of the electronic device at the second moment; wherein
in response to the electronic device meeting a first preset condition, the second mark is displayed the same as the first mark, or
in response to the electronic device not meeting the first preset condition, the second mark is displayed the same as the scenario corresponding to the second image; and
the first preset condition is:
a difference between the azimuth of the electronic device at the first moment and the azimuth of the electronic device at the second moment is less than or equal to a first threshold, and a difference between the pitch angle of the electronic device at the first moment and the pitch angle of the electronic device at the second moment is less than or equal to a second threshold; or
a product of a difference between the azimuth of the electronic device at the first moment and the azimuth of the electronic device at the second moment and a difference between the pitch angle of the electronic device at the first moment and the pitch angle of the electronic device at the second moment is less than a third threshold.

10. The method according to claim 9, wherein in another instance, the first preset condition is that the electronic device determines that a difference between the first image and the second image is less than or equal to a first preset threshold.

11. The method according to claim 10, wherein that the electronic device determines that the difference between the first image and the second image is less than or equal to the first preset threshold specifically comprises:
determining, by the electronic device, that a difference between a type and/or a quantity of objects in the first image and a type and/or a quantity of objects in the second image is less than or equal to the first preset threshold; or
determining, by the electronic device, that a distance between a data matrix of the first image and a data matrix of the second image is less than or equal to the first preset threshold.

12. The method according to claim 9, wherein
at the first moment, the electronic device is in a first geographical location, and the first geographical location is used to identify a real-time geographical location in which the electronic device is located;
at the second moment, the electronic device is in a second geographical location, and the second geographical location is used to identify a real-time geographical location in which the electronic device is located; and
in another instance, the first preset condition is that a distance between the first geographical location and the second geographical location is less than or equal to a threshold.

13. The method according to claim 9, wherein before the displaying, by the electronic device, the second interface at the second moment, wherein the second interface comprises the preview box and the second mark, the method further comprises:
determining, by the electronic device, a target scenario corresponding to the second image, wherein
the target scenario corresponding to the second image is different from a target scenario corresponding to the first image.

14. The method according to claim 9, wherein before the displaying, by the electronic device, the second interface at the second moment, wherein the second interface comprises the preview box and the second mark, the method further comprises:
determining, by the electronic device, that the second image has no corresponding target scenario.

15. The method according to claim 9, wherein the method further comprises:
in response to the electronic device not meeting the first preset condition, the second mark is displayed different from the first mark.

16. An electronic device, wherein the electronic device comprises one or more processors and a memory;
the memory is coupled to the one or more processors, the memory is configured to store computer program code, the computer program code comprises computer instructions, and the one or more processors invoke the computer instructions to enable the electronic device to perform operations, the operations comprising:
displaying a first interface at a first moment, wherein the first interface comprises a preview box and a first mark, the preview box displays a first image captured by a camera of the electronic device in real time, and the first mark is used to identify a scenario corresponding to the first image, and wherein the electronic device is in a first geographical location, and the first geographical location is used to identify a geographical location in which the electronic device is located at the first moment; and
displaying a second interface at a second moment, wherein the second interface comprises the preview box and a second mark, the preview box displays a second image captured by the camera of the electronic device in real time, the second mark is used to identify a scenario corresponding to the second image, the second image is different from the first image, and the second moment is different from the first moment, and wherein at the second moment, the electronic device is in a second geographical location, and the second geographical location is used to identify the geographical location in which the electronic device is located at the second moment; wherein in response to the electronic device meeting a first preset condition, the second mark is displayed the same as the first mark, wherein the first preset condition is that a distance between the first geographical location and the second geographical location is less than or equal to a second preset threshold.

17. The electronic device according to claim 16, wherein before the displaying, by the electronic device, the second interface at the second moment, wherein the second interface comprises the preview box and the second mark, the method further comprises:
   determining, by the electronic device, a target scenario corresponding to the second image, wherein
   the target scenario corresponding to the second image is different from a target scenario corresponding to the first image.

18. The electronic device according to claim 16, wherein before the displaying, by the electronic device, the second interface at the second moment, wherein the second interface comprises the preview box and the second mark, the method further comprises:
   determining, by the electronic device, that the second image has no corresponding target scenario.

19. The electronic device according to claim 16, wherein in response to when the electronic device does not meet the first preset condition, the second mark is displayed different from the first mark.

20. The electronic device according to claim 16, wherein:
   before the second moment, when scenarios are determined respectively for each of a plurality of images collected by the electronic device are the same, and when the electronic device does not meet the first preset condition, the second mark is displayed different from the first mark.

* * * * *